US008681642B2

(12) United States Patent
Ikeda et al.

(10) Patent No.: US 8,681,642 B2
(45) Date of Patent: Mar. 25, 2014

(54) EQUIPMENT-INFORMATION TRANSMITTING APPARATUS, SERVICE CONTROL APPARATUS, EQUIPMENT-INFORMATION TRANSMITTING METHOD, AND COMPUTER PRODUCTS

(75) Inventors: Keiichi Ikeda, Kawasaki (JP); Seigo Kotani, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 2098 days.

(21) Appl. No.: 11/495,217

(22) Filed: Jul. 28, 2006

(65) Prior Publication Data

US 2007/0067227 A1  Mar. 22, 2007

(30) Foreign Application Priority Data

Sep. 5, 2005  (JP) .................... 2005-256875

(51) Int. Cl.
*H04L 12/28* (2006.01)
*G06Q 10/00* (2012.01)

(52) U.S. Cl.
USPC ............................ 370/252; 705/28; 714/776

(58) Field of Classification Search
None
See application file for complete search history.

(56) References Cited

U.S. PATENT DOCUMENTS

| | | | |
|---|---|---|---|
| 7,204,421 B2* | 4/2007 | Austin | 235/462.01 |
| 7,513,411 B2* | 4/2009 | Yoshikawa et al. | 235/375 |
| 7,552,341 B2* | 6/2009 | Chen et al. | 713/187 |
| 2004/0139316 A1 | 7/2004 | Kotani | |
| 2004/0168062 A1* | 8/2004 | Isozaki et al. | 713/171 |
| 2004/0230528 A1 | 11/2004 | Chu | |
| 2006/0106836 A1* | 5/2006 | Masugi et al. | 707/101 |
| 2006/0107335 A1* | 5/2006 | Frank et al. | 726/27 |
| 2007/0016840 A1* | 1/2007 | Zurawka et al. | 714/776 |

FOREIGN PATENT DOCUMENTS

| | | |
|---|---|---|
| JP | 09-223169 | 8/1997 |
| JP | 2002-078125 | 3/2002 |
| JP | 2004-157790 | 6/2004 |
| JP | 2004-342066 | 12/2004 |
| JP | 2004-361996 | 12/2004 |

OTHER PUBLICATIONS

Japanese Office Action issued in corresponding Japanese Application No. 2011-121040 mailed Jan. 15, 2013.
Japanese Office Action and its partial English translation issued in corresponding Japanese Application No. 2005-256875 on Jan. 4, 2011.

* cited by examiner

*Primary Examiner* — Steven H Nguyen
(74) *Attorney, Agent, or Firm* — Greer Burns & Crain Ltd.

(57) ABSTRACT

An information generating unit generates identification information for an equipment based on environment information of the equipment. A search-result transmitting unit searches, when an information output request for equipment information generated based on the identification information is received, a database for the equipment information corresponding to the identification information, and transmits a search result as information indicating whether the equipment is allowed to receive a service.

8 Claims, 21 Drawing Sheets

FIG.4

SIGNATURE DB
15a

| EQUIPMENT ID | ELECTRONIC SIGNATURE |
|---|---|
| A10001 | 54CE18659AA5156F4722 |
| A10002 | 17A8F890C9B68906D761 |
| A10003 | 979D5AE806F86A579C56 |
| ⋮ | ⋮ |

FIG.5

ENVIRONMENT-INFORMATION DB
15b

| EQUIPMENT ID | ENVIRONMENT INFORMATION OF EQUIPMENT |
|---|---|
| A10001 | COMPANY A, OS-A, VERSION2002, ··· |
| | ··· |
| | COMPANY B, CPU-B, VERSION95, ··· |
| | COMPANY C, MEMORY-C, VERSION5, ··· |
| | ··· |
| | COMPANY D, BIOS-D, VERSION1.5, ··· |
| ⋮ | ⋮ |

FIG.6

| EQUIPMENT ID | PRODUCT NAME | ENVIRONMENT INFORMATION OF EQUIPMENT | HASH VALUE | ELECTRONIC SIGNATURE |
|---|---|---|---|---|
| A10001 | XXXXXX | COMPANY A, OS-A, VERSION2002, ... <br> ... <br> COMPANY B, CPU-B, VERSION95, ... <br> ... <br> COMPANY C, MEMORY-C, VERSION5, ... <br> ... <br> COMPANY D, BIOS-D, VERSION1.5, ... | 8c9d8072aa0d9c6f8d80a7639d35e | 54CE18659AA5156F4722 |
| ... | ... | ... | ... | ... |

EQUIPMENT-INFORMATION DB 25b

FIG.7

EVALUATION DB
25c

| ENVIRONMENT INFORMATION OF VENDER PRODUCTS (VENDER NAME, PRODUCT NAME, VERSION, ETC.) | HASHED ENVIRONMENT-INFORMATION | EVALUATION VALUE | | ... |
|---|---|---|---|---|
| | | SAFETY (SECURITY) | PERFORMANCE | |
| COMPANY A, OS-A, VERSION2002, ... | (HASH VALUE OF ENVIRONMENT INFORMATION) | 90 | 70 | ... |
| COMPANY A, OS-A, VERSION2000, ... | (HASH VALUE OF ENVIRONMENT INFORMATION) | 80 | 70 | ... |
| COMPANY B, CPU-B, VERSION95, ... | (HASH VALUE OF ENVIRONMENT INFORMATION) | 80 | 90 | ... |
| COMPANY C, MEMORY-C, VERSION5, ... | (HASH VALUE OF ENVIRONMENT INFORMATION) | 80 | 60 | ... |
| ... | ... | ... | ... | ... |

FIG.8

ENVIRONMENT-INFORMATION-OBTAINING-COMMAND DB
35a

| SERVICE ID | ENVIRONMENT-INFORMATION-OBTAINING-COMMAND ID |
|---|---|
| S0001 | COMMAND ID1 (OBTAIN ENVIRONMENT INFORMATION OF OS) |
| S0002 | COMMAND ID2 (OBTAIN ENVIRONMENT INFORMATION OF OS AND CPU) |
| S0003 | COMMAND ID3 (OBTAIN ENVIRONMENT INFORMATION OF CPU) |
| ⋮ | ⋮ |

FIG.9

SERVICE-REQUEST TABLE
35b

| SERVICE-REQUEST ID | SERVICE ID | USER ID | HASHED ENVIRONMENT-INFORMATION | EVALUATION VALUE |
|---|---|---|---|---|
| R0001 | S0001 | U0001 | (HASH VALUE OF ENVIRONMENT INFORMATION) | SAFETY: 90 PERFORMANCE: 90 |
| R0002 | S0002 | U0002 | (HASH VALUE OF ENVIRONMENT INFORMATION) | SAFETY: 70 PERFORMANCE: 90 |
| ⋮ | ⋮ | ⋮ | ⋮ | ⋮ |

FIG.10

SERVICE DB
35c

| SERVICE ID | SERVICE NAME (CONTENT NAME OF VIDEO) | CONTENTS DATA |
|---|---|---|
| S0001 | ○○○ | (DATA FOR 56K) (DATA FOR 200K) |
| S0002 | △△△ | (DATA FOR 200K) |
| S0003 | ××× | (DATA FOR 56K) (DATA FOR 200K) |
| ⋮ | ⋮ | ⋮ |

FIG.11

SERVICE-POLICY DB
35d

| SERVICE ID | SERVICE PROVIDING CONDITION | ENVIRONMENT-INFORMATION-OBTAINING-COMMAND ID |
|---|---|---|
| S0001 | SAFETY: 90 OR HIGHER PERFORMANCE: 80 OR HIGHER | COMMAND ID1 (OBTAIN ENVIRONMENT INFORMATION OF OS) |
| S0002 | SAFETY: 80 OR HIGHER | COMMAND ID2 (OBTAIN ENVIRONMENT INFORMATION OF OS AND CPU) |
| S0003 | SAFETY: 70 OR HIGHER PERFORMANCE: 80 OR HIGHER | COMMAND ID3 (OBTAIN ENVIRONMENT INFORMATION OF CPU) |
| ⋮ | ⋮ | ⋮ |

FIG.12

USER DB
35e

| USER ID | USER NAME | SERVICE HISTORY ||| CONTENTS TO BE CONTROLLED |
| --- | --- | --- | --- | --- | --- |
| | | DATE/ TIME | SERVICE ID | EVALUATION VALUE | |
| U0001 | ○○○○ | 050301/ 2200 | S0001 | SAFETY: 90 PERFORMANCE: 90 | TRANSMIT DATA FOR 200K |
| U0002 | △△△△ | 050301/ 2300 | S0002 | SAFETY: 70 PERFORMANCE: 90 | DENY TRANSMISSION OF DATA |
| ⋮ | ⋮ | ⋮ | ⋮ | ⋮ | ⋮ |

FIG.13

ENVIRONMENT-
INFORMATION TABLE
45a

| ENVIRONMENT INFORMATION OF USER EQUIPMENT |
| --- |
| COMPANY A, OS-A, VERSION2002, ⋯ |
| ... |
| COMPANY B, CPU-B, VERSION95, ⋯ |
| COMPANY C, MEMORY-C, VERSION5, ⋯ |
| ... |
| COMPANY D, BIOS-D, VERSION1.5, ⋯ |
| ⋮ |

FIG.22

COMPATIBILITY-
INFORMATION DB
65a

| COMBINATION ID | COMBINATION OF VENDER PRODUCTS |
|---|---|
| 1 | COMPANY B, CPU-B, VERSION95, |
| | COMPANY D, MEMORY-D, VERSION3, |
| ⋮ | ⋮ |

FIG.23

EVALUATION-VALUE-
CORRECTION-AMOUNT DB
75d

| COMBINATION ID | COMBINATION OF VENDER PRODUCTS | CORRECTION AMOUNT OF EVALUATION VALUE | | |
|---|---|---|---|---|
| | | SAFETY (SECURITY) | PERFORMANCE | ⋯ |
| 1 | COMPANY B, CPU-B, VERSION95, | -10 | -50 | ⋯ |
| | COMPANY D, MEMORY-D, VERSION3, | | | |
| ⋮ | ⋮ | ⋮ | ⋮ | ⋮ |

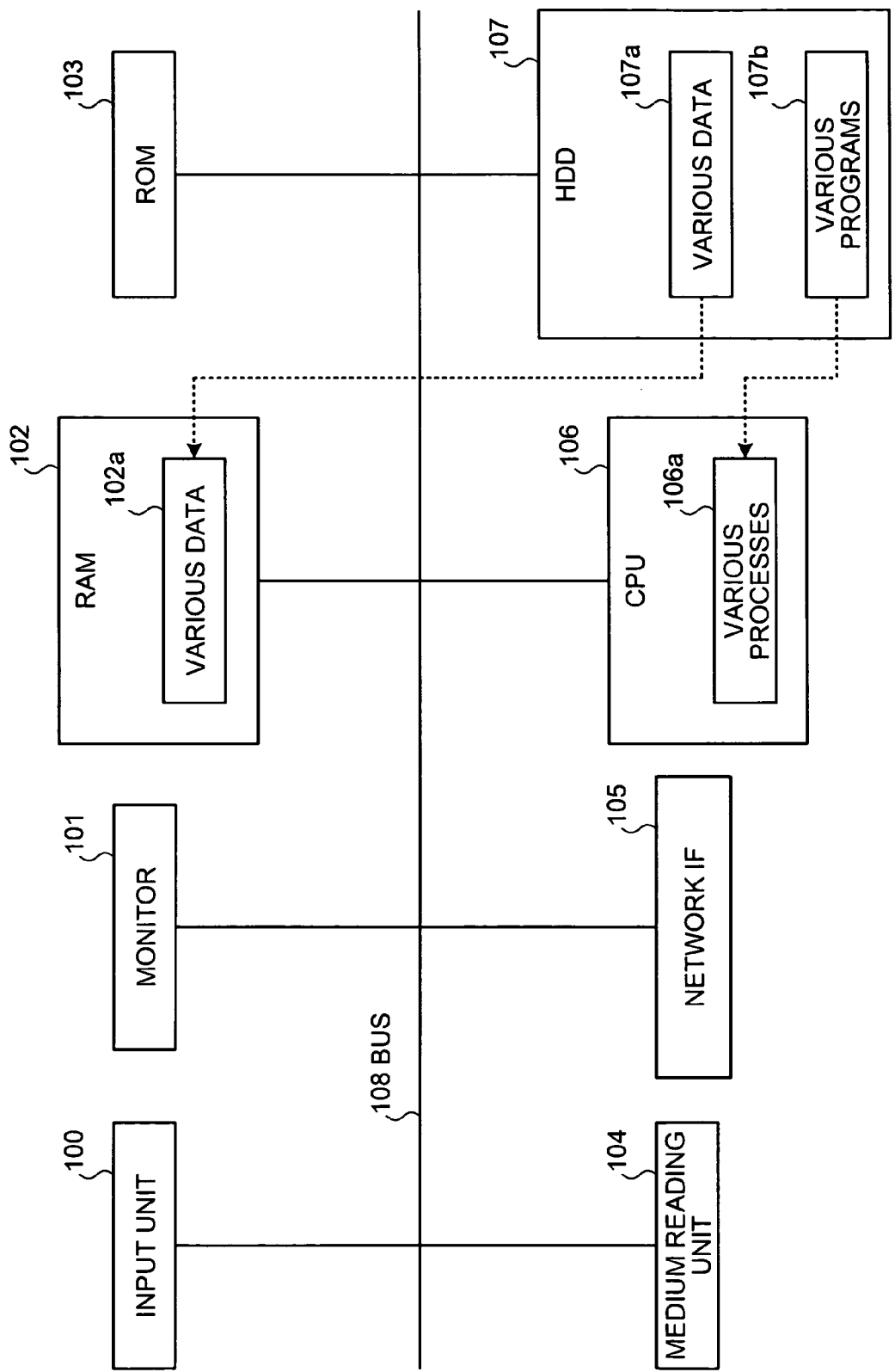

EQUIPMENT-INFORMATION TRANSMITTING APPARATUS, SERVICE CONTROL APPARATUS, EQUIPMENT-INFORMATION TRANSMITTING METHOD, AND COMPUTER PRODUCTS

BACKGROUND OF THE INVENTION

1. Field of the Invention

The present invention relates to a technology for transmitting information indicating whether an equipment is allowed to receive a service in a system in which an allowance of receiving the service is controlled based on environment information of the equipment.

2. Description of the Related Art

Conventionally, when a service of distributing contents such as films and music is provided from a terminal of a service provider to user terminals via a network, the service is provided after confirming the environment of the user terminal, to ensure the safety of the providing of the service.

For example, Japanese Patent Application Laid-Open No. 2004-157790 discloses a technique in which it is confirmed by using the terminal of the service provider whether software (in which for example, security holes are not taken care of) or hardware which can damage its safety is incorporated in the user terminal, or hardware which can damage the safety is not connected to the user terminal, by obtaining environment information of the user terminal (information of software (operating system (OS), basic input/output system (BIOS), browser, plug-in software and the like) and hardware (central processing unit (CPU), memory, protocol control information board (PCI) and the like) incorporated in the user terminal, and hardware connected to the user terminal) from the user terminal, and providing of the service is denied with respect to a user terminal that cannot ensure the safety due to a possibility of illegal copies.

In the above conventional art, however, it is difficult for the user to confirm in advance whether the user can receive the service by using his terminal reliably, which is not convenient for the user.

Specifically, it is not easy for users to check what kind of software and hardware is incorporated in their terminal. When it is determined whether to provide the service according to the software and hardware in the terminal, it is important that the users can easily confirm whether they can receive the service, and can purchase or use a terminal with security.

It is also preferable for a vendor who markets terminals to increase the convenience of users. In other words, if users can easily confirm that the terminal marketed by the vendor is a terminal that can receive the service, users can purchase and use the terminal with security.

Furthermore, there is another problem in that the equipment may not operate normally according to the combination of vendor's products to be incorporated in the user terminal (software or hardware). In this case, there is a possibility of illegal copies of contents such as films and music, and hence, the safety of the service cannot be ensured.

It is therefore an important issue as to how to ensure the safety of the service, and how to provide a mechanism in which users can confirm whether the equipment such as the user terminal can receive the service easily and efficiently.

SUMMARY OF THE INVENTION

It is an object of the present invention to at least partially solve the problems in the conventional technology.

A computer-readable recording medium according to one aspect of the present invention stores therein a computer program for transmitting information indicating whether an equipment is allowed to receive a service in a system in which an allowance of receiving the service is controlled based on environment information of the equipment. The computer program causes a computer to execute generating identification information for the equipment based on the environment information; and equipment-information transmitting including searching, when an information output request for equipment information generated based on the identification information is received, a database for the equipment information corresponding to the identification information, and transmitting a search result as the information indicating whether the equipment is allowed to receive the service.

A computer-readable recording medium according to another aspect of the present invention stores a computer program for controlling a service to be provided to an equipment based on environment information of the equipment. The computer program causes a computer to execute controlling, when information on a combination of a plurality of environments of the equipment is received, the service to be provided to the equipment based on the information on the combination of the environments.

An equipment-information transmitting apparatus according to still another aspect of the present invention transmits information indicating whether an equipment is allowed to receive a service in a system in which an allowance of receiving the service is controlled based on environment information of the equipment. The equipment-information transmitting apparatus includes an information generating unit that generates identification information for the equipment based on the environment information; and a search-result transmitting unit that searches, when an information output request for equipment information generated based on the identification information is received, a database for the equipment information corresponding to the identification information, and transmits a search result as the information indicating whether the equipment is allowed to receive the service.

A service control apparatus according to still another aspect of the present invention controls a service to be provided to an equipment based on environment information of the equipment. The service control apparatus includes a service control unit that controls, when information on a combination of a plurality of environments of the equipment is received, the service to be provided to the equipment based on the information on the combination of the environments.

A method according to still another aspect of the present invention is for transmitting information indicating whether an equipment is allowed to receive a service in a system in which an allowance of receiving the service is controlled based on environment information of the equipment. The method includes generating identification information for the equipment based on the environment information; and equipment information transmitting including searching, when an information output request for equipment information generated based on the identification information is received, a database for the equipment information corresponding to the identification information, and transmitting a search result as the information indicating whether the equipment is allowed to receive the service.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 4 is an example of information stored in a signature DB;

FIG. 5 is an example of information stored in an environment-information DB;

FIG. 6 is an example of information stored in an equipment-information DB;

FIG. 7 is an example of information stored in an evaluation DB;

FIG. 8 is an example of information stored in an environment-information-obtaining-command DB;

FIG. 9 is an example of information stored in a service-request table;

FIG. 10 is an example of information stored in a service DB;

FIG. 11 is an example of information stored in a service-policy DB;

FIG. 12 is an example of information stored in a user DB;

FIG. 13 is an example of information stored in an environment-information table;

FIG. 22 is an example of information stored in a compatibility-information DB;

FIG. 23 is an example of information stored in an evaluated value correction amount DB;

FIG. 26 depicts a hardware configuration of a computer constituting respective devices.

DETAILED DESCRIPTION OF THE PREFERRED EMBODIMENTS

Exemplary embodiments of the present invention will be explained below in detail with reference to the accompanying drawings.

Figure 1:
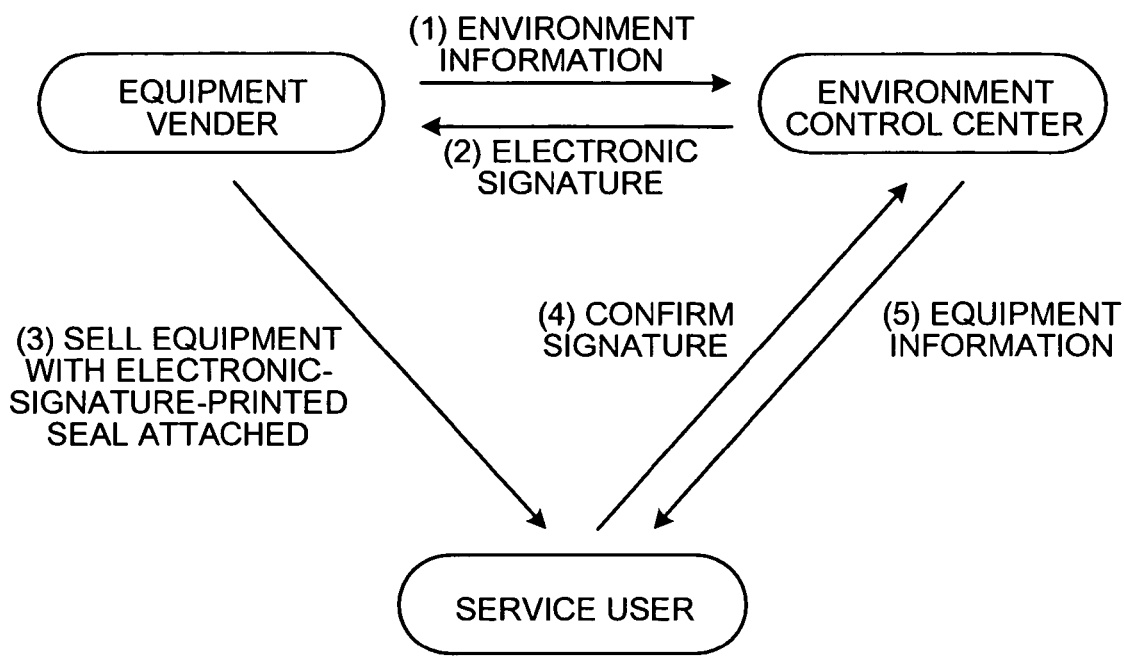
FIG. 1 is an explanatory diagram of a concept of an equipment information transmission process according to a first embodiment of the present invention.
Figure 2:
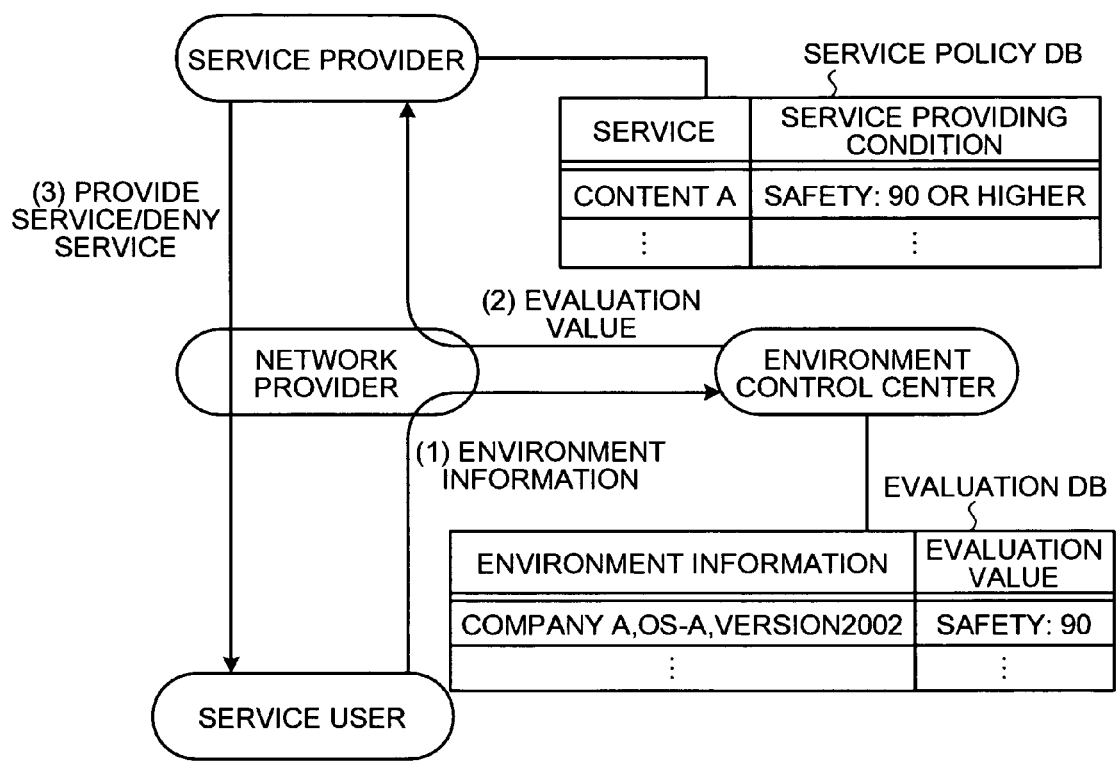
FIG. 2 is an explanatory diagram of a service control system according to the first embodiment.

FIG. 1 is an explanatory diagram of the concept of the equipment information transmission process according to a first embodiment of the present invention. FIG. 2 is an explanatory diagram of a service control system according to the first embodiment.

In a service control system that evaluates an environment of equipment held by a service user from a plurality of viewpoints of safety and the like, and controls the service provided to the equipment based on the evaluation result, the equipment information transmission process is performed for the user to confirm whether the equipment can receive the service, before purchasing and using the equipment.

The environment of the equipment stands for the software (OS, BIOS, browser, plug-in software, and the like) built in the equipment, the hardware (CPU, memory, PCI board, and the like), and the hardware connected to the equipment.

Specifically, in the equipment information transmission process, as shown in FIG. 1, a terminal of an equipment vender transmits environment information of the equipment marketed by the equipment vender to a terminal in an environment control center (see FIG. 1(1)). It is confirmed in advance that the equipment can receive the service.

The terminal in the environment control center generates an electronic signature for each equipment by hashing the environment information transmitted by the terminal of the equipment vender and encoding the information by using a secret key, and stores a hash value obtained by hashing the environment information in association with the information of the equipment (for example, a product name of the equipment). The terminal in the environment control center transmits the electronic signature to the terminal of the equipment vender (see FIG. 1(2)).

The equipment vender creates a sticker on which the electronic signature received by the terminal of the equipment vender is printed, and the sticker is attached to the equipment to market the equipment (see FIG. 1(3)). Accordingly, the service user can easily confirm that the equipment can receive the service, and can purchase the equipment with security.

The service user can confirm whether the electronic signature printed on the sticker attached to the equipment is legitimate. Specifically, the equipment of the service user generates a hash value by decoding the encoded electronic signature using a public key obtained from the environment control center, and transmits the hash value to the terminal in the environment control center (see FIG. 1(4)).

The terminal in the environment control center having received the hash value searches the database regarding whether the information (for example, product name of the equipment) of the equipment corresponding to the hash value is stored therein, and when the information of the equipment is found, transmits the information of the equipment to the terminal of the service user (see FIG. 1(5)). Accordingly, the service user can confirm that the electronic signature is not forged and is the legitimate electronic signature, and further, can confirm that the electronic signature is not issued for different equipment by confirming that the transmitted equipment information matches the equipment which the user is going to use.

The information of the hash value is transmitted to the terminal in the environment control center by using the equipment attached with the sticker having the electronic signature printed thereon. However, the information of the hash value of the equipment attached with the sticker can be transmitted by using equipment other than the equipment attached with the sticker, and the search result of the equipment information can be received from the terminal in the environment control center, to confirm whether the electronic signature of the equipment attached with the sticker is legitimate.

The equipment of the service user then receives the service from the service provider by the service control system as shown in FIG. 2. The service control system controls the service provided to the terminal of the service user from the terminal of the service provider via the network.

That is, the service control system controls the service corresponding to the environment of the service user equipment, such that the service control system provides contents such as films and music to the service user equipment from the terminal of the service provider via the network, and denies the service with respect to a service user equipment in which software (for example, the security holes are not taken care of) or hardware that can damage the safety is incorporated, or to a service user equipment to which hardware that can damage the safety is connected.

Specifically, in the service control system, the environment control center, which is a third party organization other than the service provider, controls the service by cooperating with the service provider. Upon acquisition of the information of the software or the hardware built in the service user equipment (environment information) from the equipment vender or the like, the environment control center terminal gives an evaluation value to the equipment from viewpoints of safety and performance based on the vulnerability and capacity of the software and the hardware, and controls the service, associating the evaluation value with the environment information.

For example, the terminal in the environment control center controls the evaluation DB in which the environment information is associated with the evaluation value, such as "OS-A (version2002) of company A=safety evaluation value is 90 points, and performance evaluation value is 70 points, OS-A (version2000) of company A=safety evaluation value is 90 points, and performance evaluation value is 70 points", and so on.

On the other hand, the service provider controls the evaluation value necessary for providing the respective contents as the service providing condition, in association with the service (contents). For example, the terminal of the service provider controls the service-policy DB in which the respective service is associated with the service providing condition such that "providing condition of content A=safety evaluation value is 90 points or higher, and performance evaluation value is 90 points or higher, providing condition of content B=safety evaluation value is 70 points or higher, and performance evaluation value is 90 points or higher", and so on.

When the service user receives the service from the service provider, the environment information of the service user equipment is transmitted to the terminal in the environment control center via a network provider (see FIG. 2(1)). The terminal in the environment control center calculates an evaluation value corresponding to the received environment information based on the evaluation DB, and transmits the calculated evaluation value to the terminal of the service provider via the network provider (see FIG. 2(2)).

The service provider terminal determines whether the received evaluation value satisfies the service providing condition based on the service-policy DB, to control the service such as distributing the contents or refusing the service (see FIG. 2(3)).

Thus, in the service control system that confirms whether the environment of the equipment is safe, and provides the service to the equipment when the environment is safe, the service user desires to confirm whether the equipment can receive the service before purchasing and using the equipment. By using the system as shown in FIG. 1, the service user can confirm the information easily and efficiently.

Since the service user can easily confirm whether the equipment can receive the service, and the user can have a sense of security, the equipment vendor can promote the sales of the equipment. Furthermore, if the system is configured that the environment control center receives a fee of the electronic signature from the equipment vendor, the environment control center can also make a profit therefrom.

Figure 3:
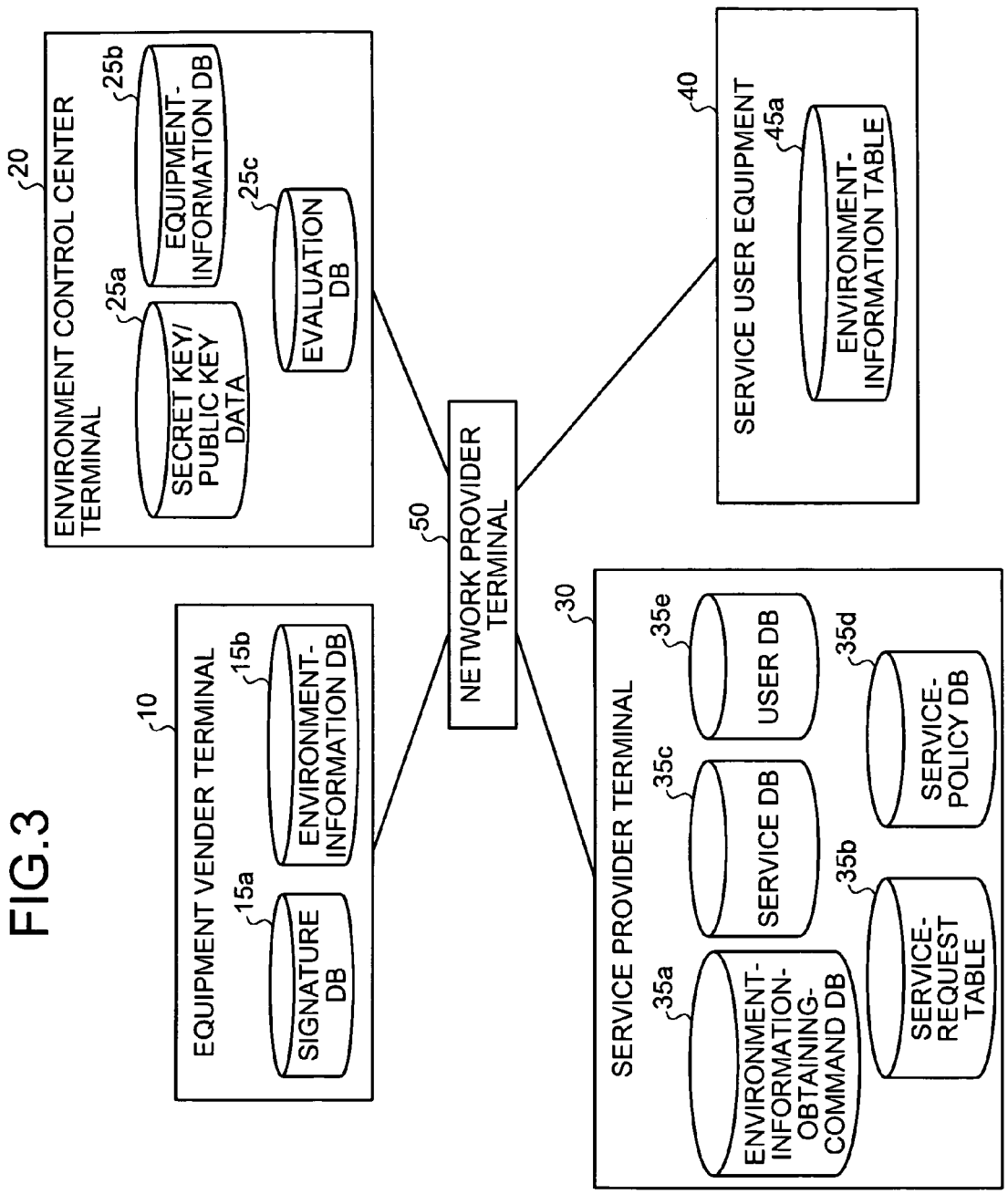
FIG. 3 depicts a configuration of the service control system according to the first embodiment.

FIG. 3 depicts the configuration of the service control system according to the first embodiment. As shown in FIG. 3, the service control system according to the first embodiment is formed by connecting an equipment vender terminal 10, an environment control center terminal 20, a service provider terminal 30, and a service user equipment 40 by a network provider terminal 50 via the network (Internet, local area network (LAN), public telephone network, and the like) so as to be able to communicate with each other. The respective devices 10 to 40 create various types of storing units (database, table, and the like) as a process prior to service control as explained below.

The equipment vender terminal 10 is a computer that is held by the equipment vender, and, as shown in FIG. 3, includes a signature DB 15a and an environment-information DB 15b. The signature DB 15a stores the electronic signatures received from the environment control center terminal 20, and specifically as shown in FIG. 4, stores the electronic signature in association with an equipment ID for uniquely identifying the respective equipment. The "electronic signature" is registered in the signature DB 15a every time the electronic signature is received from the environment control center terminal 20.

The environment-information DB 15b stores the environment information of the respective equipment, and specifically as shown in FIG. 5, stores the information (environment information of the equipment) of the software (OS, BIOS, browser, plug-in software, and the like) and the hardware (CPU, memory, PCI board, and the like) built in the equipment in association with the equipment ID. The "environment information of the equipment" stands for information of the software and the hardware collected by the respective equipment itself by using a security chip referred to as a trusted platform module (TPM).

The environment control center terminal 20 is a server computer that is held in the environment control center, and includes, as shown in FIG. 3, secret key/pubic key data 25a, an equipment-information DB 25b, and an evaluation DB 25c.

The secret key/public key data 25a stores a secret key used when the electronic signature is generated by hashing and encoding the environment information of the equipment, and a public key for encoding the electronic signature.

The equipment-information DB 25b stores the information of the equipment that has generated the electronic signature, and specifically, as shown in FIG. 6, stores the equipment ID, the product name of the equipment, the environment information of the equipment, the hash value obtained by hashing the environment information, and the electronic signature obtained by encoding the hash value by the secret key in association with each other. These pieces of information are registered in the equipment-information DB 25b every time the electronic signature is generated.

The evaluation DB 25c stores the evaluation value of the vender product built in the service user equipment 40, and specifically, as shown in FIG. 7, stores the environment information of the vender product, the hashed environment-information, and the evaluation value in association with each other.

The "environment information" and the "hashed environment-information" are registered in the evaluation DB 25c every time the information (environment information) of the software and the hardware built in the service user equipment 40 is obtained from the equipment vender.

The "evaluation value" is determined from a viewpoint of safety and performance based on the vulnerability and capacity of the vender product at the time of obtaining the vender product, and registered in association with the "environment information" and the "hashed environment-information".

The registered "evaluation value" is updated and registered according to a review performed when new vulnerability (security holes) is found later, or a high-performance new product is manufactured.

The "evaluation value" includes the "safety evaluation value" determined from the viewpoint of security based on the vulnerability of the vender product, and the "performance evaluation value" determined from the viewpoint of the performance based on the capacity of the vender product.

The service provider terminal 30 is a server computer that is held by the service provider, and includes, as shown in FIG. 3, an environment-information-obtaining-command DB 35*a*, a service-request table 35*b*, a service DB 35*c*, a service-policy DB 35*d*, and a user DB 35*e*.

The environment-information-obtaining-command DB 35*a* stores information of an environment information obtaining command (a command specifying the type of the environment information used for evaluation), and specifically, as shown in FIG. 8, stores the service ID and the environment-information-obtaining-command ID in association with each other for each service (content) provided by the service provider. As for the service ID and the environment-information-obtaining-command ID, the information provided online or offline from the service provider is registered.

The service-request table 35*b* stores information of a service request received from the service user equipment 40, and specifically, as shown in FIG. 9, stores a service-request ID for uniquely identifying each service request, the service ID included in the service request, the user ID included in the service request, the hashed environment-information received from the service user equipment 40, and the evaluation value obtained from the environment control center terminal 20 in association with each other for each service request.

The service DB 35*c* stores information of the service (for example, contents) provided by the service provider, and specifically, as shown in FIG. 10, stores the service ID for uniquely identifying each content, a service name (a content name of video), and content data in association with each other for each service (content).

The content data includes, as shown in FIG. 10, high-resolution picture data suitable for providing to a high-performance service user equipment 40, and low-resolution picture data suitable for providing to a low-performance service user equipment 40, although it is the same content.

The service-policy DB 35*d* stores a policy relating to the providing of service, and specifically, as shown in FIG. 11, stores the service ID of each content (service), a service providing condition (an evaluation value required for the providing of each content), and the environment-information-obtaining-command ID (a command specifying the type of the environment information used for evaluation) in association with each other.

As the service providing condition, a service control can be realized that the content is provided only to the equipment having a high evaluation point (for example, equipment that is not vulnerable or not low-performance), by setting the "evaluation value".

That is, for example, the requested contents is read from the service DB 35*c* and provided to the service user equipment 40 satisfying the evaluation value in the service providing condition, and, providing of the contents is refused with respect to the service user equipment 40 not satisfying the evaluation value in the service providing condition. Alternatively, a low-resolution content data is read from the service DB 35*c* and provided to the service user equipment 40, whose evaluation value is low only for the performance evaluation value. Thus, the service control corresponding to the service policy specified in the service-policy DB 35*d* is executed.

Furthermore, a message indicating that, while the required service cannot be provided in the current status, the status can be changed by following the presented procedure, can be shown to the service user. That is, the use of the service is not simply denied, and the user can be prompted by indicating that if a version of the OS is upgraded, the service can be provided.

The reason why the "environment-information-obtaining-command ID" is specified for each service is that the evaluation object (for example, only the safety of the OS, only the performance of the OS, safety and performance of the OS and a CPU) can be different for each service.

The user DB 35*e* stores the information of the service user, and specifically, as shown in FIG. 12, stores the user ID for uniquely identifying the service user, the user name, and the service history (a service control date, a service ID, an evaluation value used for service control, and an execution result of the service control) in association with each other for each service user.

The service user equipment 40 is a digital versatile disk (DVD) player, a personal computer, a workstation, a home gaming machine, an Internet television, a personal digital assistant (PDA), or a mobile communication terminal such as a mobile phone or personal handy-phone system (PHS) or the like held by the service user, in which at least communication software such as a Web browser is installed. As shown in FIG. 3, the service user equipment 40 includes an environment-information table 45*a*.

The environment-information table 45*a* stores the information of the environment of the service user equipment 40, and specifically, as shown in FIG. 13, stores the environment information of the software (OS, BIOS, browser, plug-in software, and the like) and the hardware (CPU, memory, PCI board, and the like) built in the service user equipment 40, and the hardware connected to the service user equipment 40, respectively.

The environment information is collected by the service user equipment 40 at the time of startup of the service user equipment 40 and registered in the environment-information table 45*a*. When the software is newly installed or the hardware is newly connected after the startup of the service user equipment 40, the service user equipment 40 collects the environment information and registers the information in the environment-information table 45*a*. The environment information can be collected by using the security chip referred to as TPM.

Figure 14:
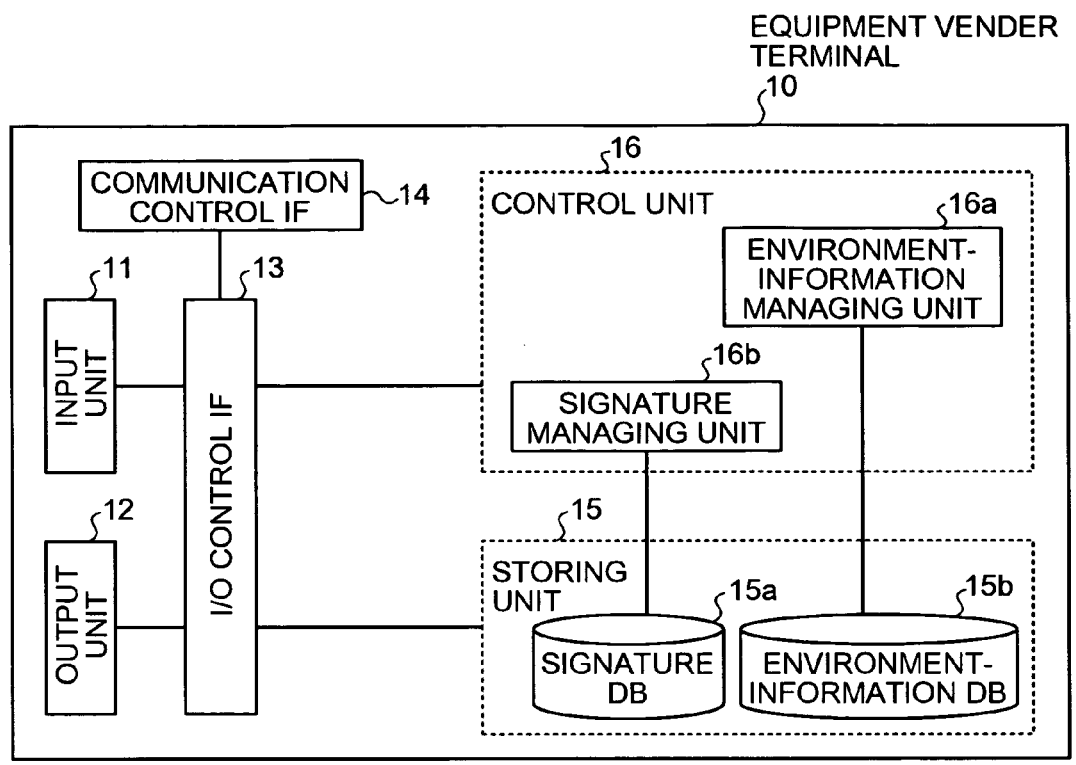
FIG. 14 depicts a functional configuration of an equipment vender terminal.

FIG. 14 depicts a functional configuration of the equipment vender terminal 10. As shown in FIG. 14, the equipment vender terminal 10 includes an input unit 11, an output unit 12, an input/output (I/O) control IF 13, a communication control IF 14, a storing unit 15, and a control unit 16.

The input unit 11 is, for example, a keyboard, a mouse, a microphone, and the like that input various pieces of information. The output unit 12 is, for example, a monitor (or a display or a touch panel), a speaker, a printer, and the like that output various pieces of information.

The I/O control IF 13 controls input and output of data by the input unit 11 and the output unit 12, and the communication control IF 14 controls communication mainly with the environment control center terminal 20.

The storing unit 15 stores data and programs required for various types of processes performed by the control unit 16, and includes the signature DB 15a and the environment-information DB 15b. The signature DB 15a stores the electronic signature received from the environment control center terminal 20 (see FIG. 4), and the environment-information DB 15b stores the environment information of the respective equipment (see FIG. 5) as explained above.

The control unit 16 has an internal memory for storing programs specifying various process procedures and control data, executes various types of processes according to these programs and data, and includes an environment-information managing unit 16a and a signature managing unit 16b.

The environment-information managing unit 16a manages the environment information of the equipment. Specifically, the environment-information managing unit 16a obtains the environment information, and stores the environment information in the environment-information DB 15b. The environment information can be obtained by receiving an input of the environment information by the input unit 11, or can be obtained via the network from other devices via the communication control IF 14.

The environment-information managing unit 16a reads the environment information of the equipment, which requests generation of the electronic signature to the environment control center terminal 20, from the environment-information DB 15b, and executes processes for transmitting the environment information to the environment control center terminal 20.

The signature managing unit 16b manages the electronic signatures received from the environment control center terminal 20. Specifically, the signature managing unit 16b stores the electronic signatures received from the environment control center terminal 20 in the signature DB 15a, in association with the equipment for which the electronic signature has been generated. Upon reception of an output request of the electronic signature, the signature managing unit 16b reads the electronic signature from the signature DB 15a and outputs the electronic signature to the output unit 12.

Figure 15:
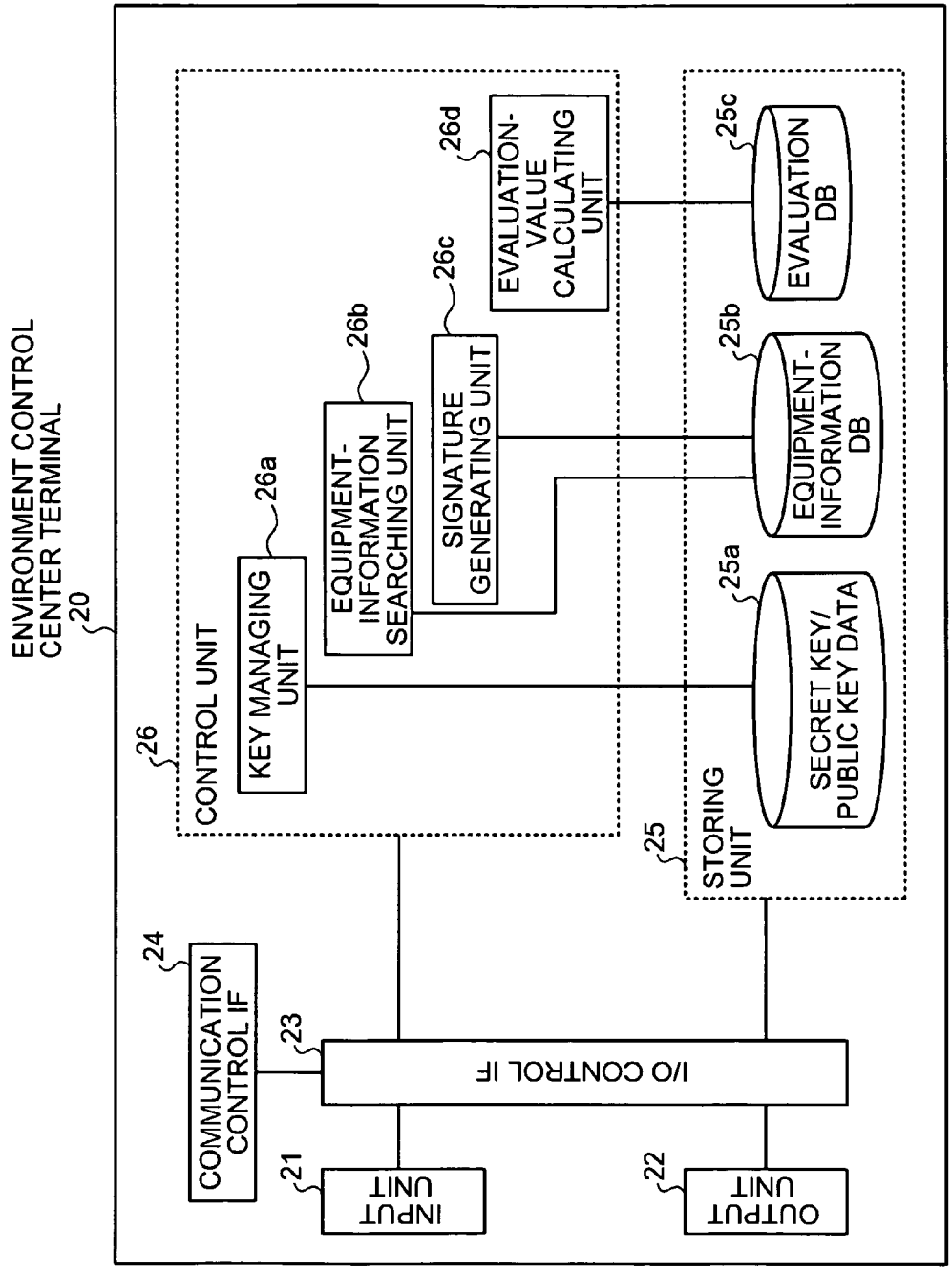
FIG. 15 depicts a functional configuration of an environment control center terminal.

FIG. 15 depicts the functional configuration of the environment control center terminal 20. As shown in FIG. 15, the environment control center terminal 20 includes an input unit 21, an output unit 22, an I/O control IF 23, a communication control IF 24, a storing unit 25, and a control unit 26.

The input unit 21 is, for example, a keyboard, a mouse, a microphone, and the like that input various pieces of information. The output unit 22 is, for example, a monitor (or a display or a touch panel), a speaker, a printer, and the like that output various pieces of information.

The I/O control IF 23 controls input and output of data by the input unit 21 and the output unit 22, and the communication control IF 24 controls communication with the equipment vender terminal 10, the service provider terminal 30, and the service user equipment 40.

The storing unit 25 stores data and programs required for various types of processes performed by the control unit 26, and includes the secret key/pubic key data 25a, the equipment-information DB 25b, and the evaluation DB 25c.

The secret key/public key data 25a stores the secret key used when the electronic signature is generated by encoding the hashed environment-information of the equipment, and the public key used when the electronic signature is decoded.

The equipment-information DB 25b stores the information of the equipment that has generated the electronic signature (see FIG. 6), and the evaluation DB 25c stores the evaluation value of the vender product built in the service user equipment 40 (see FIG. 7).

The control unit 26 has an internal memory for storing programs specifying various process procedures and control data, executes various types of processes according to these programs and data, and includes a key managing unit 26a, an equipment-information searching unit 26b, a signature generating unit 26c, and an evaluation-value calculating unit 26d.

The key managing unit 26a stores the secret key used for encoding the hash value when the electronic signature is generated and the public key used when the electronic signature is decoded in the storing unit 25, and manages these secret keys and public keys. Upon reception of the transmission request from the service user equipment 40, the key managing unit 26a reads the public key from the storing unit 25, and transmits the public key to the service user equipment 40.

Upon reception of the information of the hash value obtained by decoding the electronic signature printed on the sticker attached to the equipment from the service user equipment 40, the equipment-information searching unit 26b searches the equipment-information DB 25b for the information (product name information) relating to the equipment, by using the hash value as a search key.

When the information of the equipment is found, the equipment-information searching unit 26b transmits the information and a message indicating success of the search to the service user equipment 40. Accordingly, the service user can confirm that the electronic signature printed on the sticker attached to the equipment is legitimate.

On the other hand, when the information of the equipment cannot be found, the equipment-information searching unit 26b transmits a message indicating that there is no information of the equipment to the service user equipment 40. Accordingly, the service user can confirm that the electronic signature printed on the sticker attached to the equipment is not legitimate.

Upon reception of the environment information of the equipment from the equipment vender terminal 10, the signature generating unit 26c generates the electronic signature based on the environment information. Specifically, upon reception of the environment information of the equipment from the equipment vender terminal 10, the signature generating unit 26c generates the electronic signature by hashing the environment information and encoding the obtained hash value by the secret key.

The signature generating unit 26c stores the equipment ID having received from the equipment vender terminal 10, the information of the product and the environment information in association with the hash value and the electronic signature. The signature generating unit 26c transmits the generated electronic signature to the equipment vender terminal 10.

The evaluation-value calculating unit 26d evaluates the environment relating to the service user equipment 40 and calculates an evaluation value. Specifically, upon reception of an evaluation request including the hashed environment-information and the service-request ID from the service provider terminal 30, the evaluation-value calculating unit 26d calculates the evaluation value by reading the evaluation value corresponding to the hashed environment-information included in the request from the evaluation DB 25c.

Figure 16:
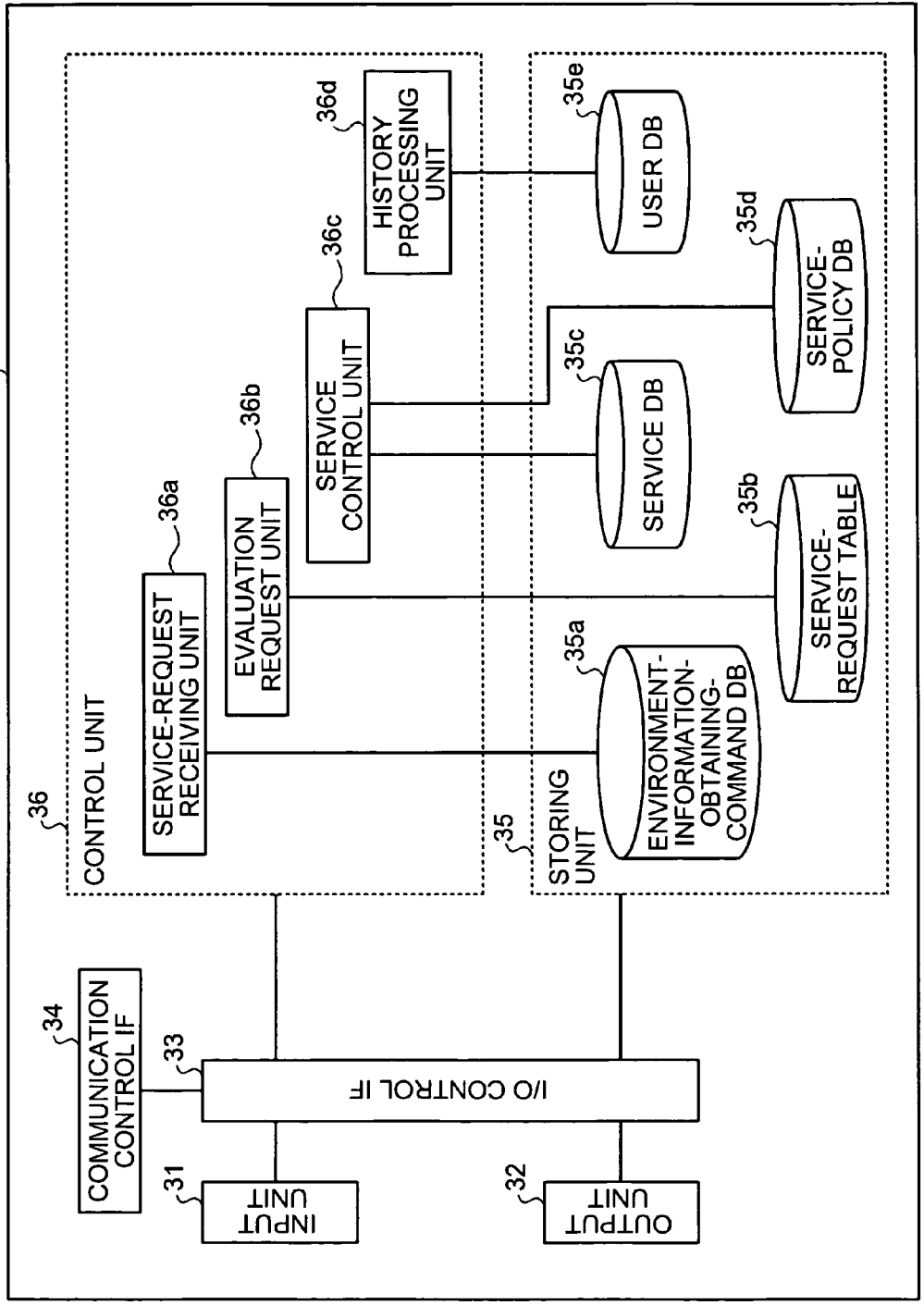
FIG. 16 depicts a functional configuration of a service provider terminal.

FIG. 16 depicts the functional configuration of the service provider terminal 30. As shown in FIG. 16, the service provider terminal 30 includes an input unit 31, an output unit 32, an I/O control IF 33, a communication control IF 34, a storing unit 35, and a control unit 36.

The input unit 31 is, for example, a keyboard, a mouse, a microphone, and the like that input various pieces of information. The output unit 32 is, for example, a monitor (or a display or a touch panel), a speaker, a printer, and the like that output various pieces of information.

The I/O control IF 33 controls input and output of data by the input unit 31 and the output unit 32, and the communication control IF 34 controls communication with the environment control center terminal 20 and the service user equipment 40.

The storing unit 35 stores data and programs required for various types of processes performed by the control unit 36, and includes the environment-information-obtaining-command DB 35a, the service-request table 35b, the service DB 35c, the service-policy DB 35d, and the user DB 35e.

The environment-information-obtaining-command DB 35a stores information of an environment information obtaining command (see FIG. 8), and the service-request table 35b stores information of the service request received from the service user equipment 40 (see FIG. 9). The service DB 35c stores information of the service provided by the service provider (see FIG. 10), the service-policy DB 35d stores a policy relating to providing of the service (see FIG. 11), and the user DB 35e stores information of the service user (see FIG. 12).

The control unit 36 has an internal memory for storing programs specifying various process procedures and control data, executes various types of processes according to these programs and data, and includes a service-request receiving unit 36a, an evaluation request unit 36b, a service control unit 36c, and a history processing unit 36d.

The service-request receiving unit 36a receives a service request from the service user equipment 40. Specifically, the service-request receiving unit 36a receives a service request message (for example, an HTTP message) including the service ID of the service to be requested and the user ID of the service user from the service user equipment 40.

The service-request receiving unit 36a issues a service-request ID upon reception of the service request message, and registers the service-request ID, the service ID, and the user ID in the service-request table 35b, in association with each other.

The evaluation request unit 36b receives the environment information of the service user equipment 40 from the service user equipment 40, and transmits the environment information to the environment control center terminal 20 to request calculation of an evaluation value.

Specifically, the evaluation request unit 36b reads the environment-information-obtaining-command ID corresponding to the service ID included in the service request from the environment-information-obtaining-command DB 35a, and transmits the environment-information-obtaining-command ID to the service user equipment 40.

Upon reception of the hashed environment-information from the service user equipment 40, the evaluation request unit 36b registers the hashed environment-information in the service-request table 35b, and transmits the hashed environment-information and the corresponding service-request ID to the environment control center terminal 20 to request calculation of an evaluation value.

The service control unit 36c controls the service to be provided to the service user equipment 40 based on the evaluation value calculated by the environment control center terminal 20. Specifically, upon reception of the evaluation value corresponding to the service ID and the user ID from the environment control center terminal 20, the service control unit 36c refers to the service-policy DB 35d, to determine whether the evaluation value included in the service request satisfies the service providing condition of the service ID included in the service request, and controls the service to be provided to the service user equipment 40.

The history processing unit 36d processes the history of the service with respect to the service user. Specifically, the history processing unit 36d registers the service history including service control date, service ID, evaluation value used for the service control, and execution result of the service control in the user DB 35e, in association with the user ID and user name of the service user having requested providing of the service, after execution of the service control by the service control unit 36c.

The service provider terminal 30 receives the service request from the service user equipment 40, and requests evaluation of the environment of the service user equipment 40 to the environment control center terminal 20, but the network provider terminal 50 can executes the processes on behalf of the service provider terminal 30.

Specifically, the network provider terminal 50 receives a service request from the service user equipment 40, and transmits the environment-information-obtaining-command ID to the service user equipment 40. Upon reception of the hashed environment-information from the service user equipment 40, the network provider terminal 50 transmits the hashed environment-information and a corresponding service-request ID to the environment control center terminal 20 to request calculation of an evaluation value. Thereafter, the network provider terminal 50 needs only to transmit the evaluation value information received from the environment control center terminal 20 to the service provider terminal 30.

Figure 17:
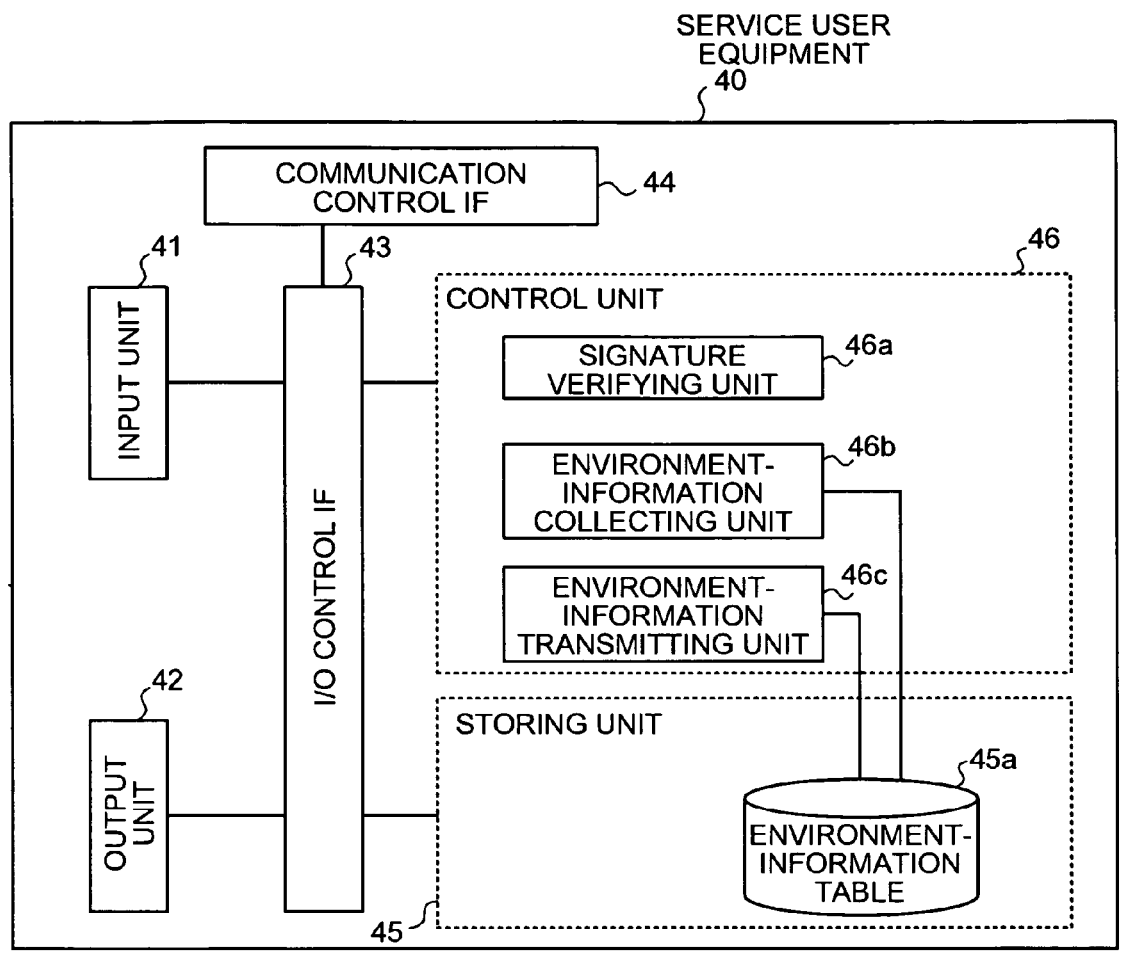
FIG. 17 depicts a functional configuration of service user equipment.

FIG. 17 depicts the functional configuration of the service user equipment 40. As shown in FIG. 17, the service user equipment 40 includes an input unit 41, an output unit 42, an I/O control IF 43, a communication control IF 44, a storing unit 45, and a control unit 46.

The input unit 41 is, for example, a keyboard, a mouse, a microphone, and the like that input various pieces of information. The output unit 42 is, for example, a monitor (or a display or a touch panel), a speaker, a printer, and the like that output various pieces of information.

The I/O control IF 43 controls input and output of data by the input unit 41 and the output unit 42, and the communication control IF 44 controls communication with the environment control center terminal 20 and the service provider terminal 30.

The storing unit 45 stores data and programs required for various types of processes performed by the control unit 46, and includes the environment-information table 45a. The environment-information table 45a stores information of the environment of the service user equipment 40 (see FIG. 13).

The control unit 46 has an internal memory for storing programs specifying various procedures and control data, executes various types of processes according to these programs and data, and as shown in FIG. 17, includes a signature verifying unit 46a, an environment-information collecting unit 46b, and an environment-information transmitting unit 46c.

The signature verifying unit 46a verifies whether the electronic signature printed on the sticker attached to the equipment is legitimate. Specifically, the signature verifying unit 46a receives the information of the electronic signature input by the service user via the input unit 41, while confirming the sticker having the electronic signature printed thereon.

The signature verifying unit 46a obtains a public key for decoding the electronic signature from the environment control center terminal 20, and decodes the electronic signature by using the public key, to obtain a hash value. Thereafter, the signature verifying unit 46a transmits the hash value information to the environment control center terminal 20, and requests the environment control center terminal 20 to make a search in the equipment-information DB 25b whether the information of the equipment corresponding to the hash value is registered in the equipment-information DB 25b.

The signature verifying unit 46a receives the information relating to the search result from the environment control center terminal 20, and outputs the information to the output unit 42. When the information of the equipment is registered in the equipment-information DB 25b, the electronic signature can be confirmed to be legitimate. When the information of the equipment is not registered in the equipment-information DB 25b, it can be confirmed that the electronic signature is not legitimate.

The environment-information collecting unit 46b collects the environment information of the service user equipment 40. Specifically, when the service user equipment 40 is started up, the environment-information collecting unit 46b collects the own environment information and registers the environment information in the environment-information table 45a. When the software is newly installed or the hardware is newly connected after the startup of the service user equipment 40, the environment-information collecting unit 46b collects the own environment information and registers the information in the environment-information table 45a. The environment information can be collected by using the security chip referred to as TPM.

The environment-information transmitting unit 46c transmits the environment information to the service provider terminal 30 at the time of requesting the service. Specifically, upon reception of the environment-information-obtaining-command ID from the service provider terminal 30 in response to transmission of the service request including the service ID and the user ID, the environment-information transmitting unit 46c reads the environment information specified by the environment-information-obtaining-command ID from the environment-information table 45a, and transmits hashed environment-information to the service provider terminal 30.

Figure 18:
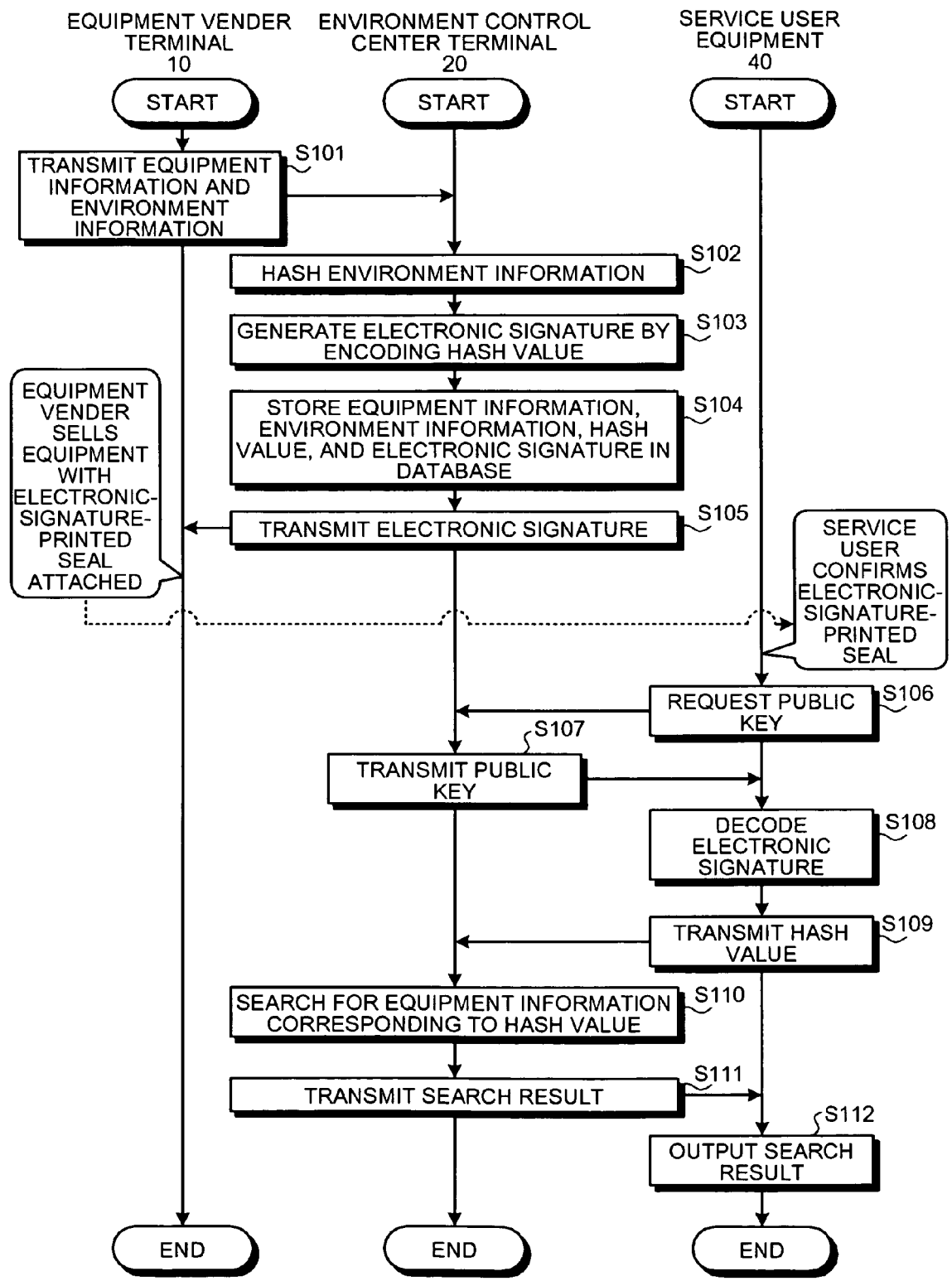
FIG. 18 is a flowchart of a process at the time of generating and confirming an electronic signature.

FIG. 18 is a flowchart of a process at the time of generating and confirming the electronic signature. As shown in FIG. 18, when the equipment information and the environment information are transmitted from the equipment vender terminal 10 to the environment control center terminal 20 (step S101), the environment control center terminal 20 hashes the environment information (step S102), and encodes a hash value obtained by hashing with the secret key to generate an electronic signature (step S103).

The environment control center terminal 20 then creates the equipment-information DB 25b by storing the equipment information, the environment information, the hash value, and the electronic signature in a database in association with each other (step S104), and transmits the electronic signature to the equipment vender terminal 10 (step S105).

The equipment vender prints the electronic signature having received by the equipment vender terminal 10 on a sticker, attaches the sticker on the equipment, and markets the equipment. The service user confirms that the sticker having the electronic signature printed thereon is attached to the equipment, before purchasing and using the equipment.

Consequently, the service user can confirm that the equipment can receive the service, and can purchase and use the equipment with security. The process described below is performed for confirming that the electronic signature is not forged, and it is legitimate.

Upon reception of a request to confirm that the electronic signature is legitimate from the service user, the service user equipment 40 requests the environment control center terminal 20 to transmit a public key (step S106).

The environment control center terminal 20 having received the request transmits the public key to the service user equipment 40 (step S107). The service user equipment 40 decodes the electronic signature input by the service user by using the public key (step S108), and transmits the hash value information obtained as a result of decoding to the environment control center terminal 20 (step S109).

The environment control center terminal 20 receives the hash value, and searches the equipment-information DB 25b for the equipment information by using the hash value as a search key (step S110). The environment control center terminal 20 transmits the search result to the service user equipment 40 (step Sill). The search result includes the equipment information when the equipment information is found, and includes the information indicating that the equipment information is not found, when the equipment information is not found.

The service user equipment 40 receives the search result information, and outputs the search result (step S112). The service user checks the output search result to confirm that the electronic signature is legitimate when the equipment information is output. The service user can also confirm that the electronic signature is not issued for different equipment by confirming that the transmitted equipment information matches the equipment, which the user is going to use. When the equipment information is not found, the service user can confirm that the electronic signature is not legitimate.

Figure 19:
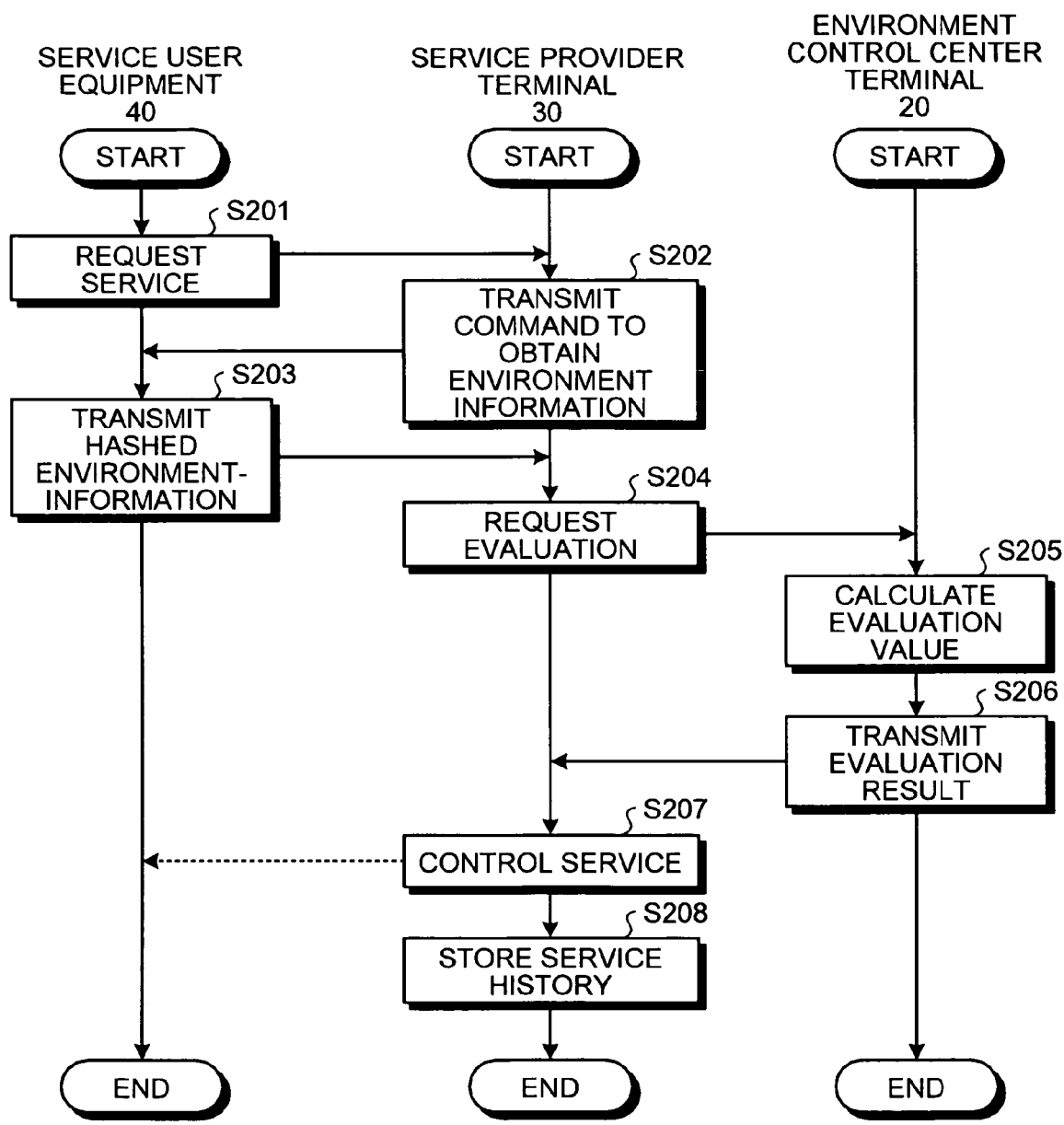
FIG. 19 is a flowchart of a process at the time of service control.

FIG. 19 is a flowchart of the process at the time of service control. As shown in FIG. 19, when a service request message including a service ID and a user ID is transmitted from the service user equipment 40 to the service provider terminal 30 (step S201), the service provider terminal 30 issues a service-request ID and registers the service-request ID, the service ID, and the user ID in association with each other in the service-request table 35b. The service provider terminal 30 then reads the environment-information-obtaining-command ID corresponding to the service ID from the environment-information-obtaining-command DB 35a and transmits the command ID to the service user equipment 40 (step S202).

On the other hand, the service user equipment 40 having received the environment-information-obtaining-command ID reads the environment information specified by the environment-information-obtaining-command ID from the environment-information table 45a, and transmits hashed environment-information to the service provider terminal 30 (step S203).

Subsequently, the service provider terminal 30 registers the hashed environment-information in the service-request table 35b, and transmits the hashed environment-information and a corresponding service-request ID to the environment control center terminal 20 to request calculation of an evaluation value (step S204).

Thereafter, the environment control center terminal 20 having received the evaluation request calculates an evaluation value by reading the evaluation value corresponding to the hashed environment-information included in the request from the evaluation DB 25c (step S205). The environment control center terminal 20 transmits the evaluation result including the evaluation value and the service-request ID to the service provider terminal 30 (step S06).

Subsequently, the service provider terminal 30 registers the evaluation value received from the environment control center terminal 20 in the service-request table 35b, and determines whether the evaluation value included in the service request satisfies the service providing condition of the service ID included in the service request by referring to the service-policy DB 35*d*, to control the service to be provided to the service user equipment 40 (step S207).

That is, for example, the service provider terminal 30 executes the service control corresponding to the service policy specified in the service-policy DB 35*d* such that the service provider terminal 30 provides the requested contents only to the service user equipment 40 that satisfies the evaluation value in the service providing condition, by reading the contents from the service DB 35*c*.

After the execution of service control, the service provider terminal 30 registers service control date, service ID, and service history including the evaluation value used for the service control and execution result of the service control in the user DB 35*e*, in association with the user ID and the user name of the service user, who has requested the service (step S208).

According to the first embodiment, it is assumed that the environment control center is a reliable organization. However, it can be possible that the equipment vendor conspires with the environment control center to create a false electronic signature. To prevent this, a higher-level authentication center that authenticates that the environment control center is legitimate can be established.

In this case, the higher-level authentication center confirms that the environment control center, which generates electronic signatures, is legitimate and a terminal in the higher-level authentication center transmits an electronic certificate to the environment control center terminal 20. The environment control center terminal 20 having received the electronic certificate transmits the electronic certificate having received from the higher-level authentication center to the service user equipment 40. The service user can determine whether the environment control center is a legitimate center authenticated by the higher-level authentication center by checking the information of the issuer of the electronic certificate.

According to the first embodiment, the environment control center terminal 20 generates the electronic signature by obtaining the environment information of the equipment from the equipment vender terminal 10. However, the environment control center terminal 20 can receive information of a software program developed by the service user from the service user equipment 40, to generate an electronic signature to be displayed on a window of the software program, which displays version information and the like. The developer of the software program provides the software program so that the electronic signature is displayed on the window.

The service user can confirm that the software program is applicable to the environment that can receive the service from the service provider by confirming the electronic signature.

If it is desired to confirm the validity of the electronic signature, the service user transmits the information of the hash value obtained by decoding the electronic signature displayed on the window to the environment control center terminal 20, to confirm the validity according to the method described above.

According to the first embodiment, the hash value or the electronic signature obtained by encoding the hash value are used as identification information for identifying the equipment, but the identification information is not limited thereto, so long as the information can uniquely identify the equipment, and various types of information can be used.

Furthermore, according to the first embodiment, the environment control center terminal 20 generates the electronic signature for each equipment based on the information of the environment of the equipment, and the service user equipment 40 generates an information output request of the information of the equipment based on the electronic signature generated by the environment control center terminal 20 and transmits the information output request. Upon reception of the information output request, the environment control center terminal 20 searches the equipment-information DB 25*b*, in which the information of the equipment is stored, for the information of the equipment corresponding to the identification information, and transmits the information relating to the search result to the service user equipment 40 as the information as to whether the equipment can receive the service. Accordingly, the service user can confirm whether the equipment can receive the service from the service provider easily and efficiently.

Moreover, according to the first embodiment, since the environment control center terminal 20 generates the electronic signature for each equipment based on the information of the environment of the equipment read by the TPM, the information of the environment of the equipment can be efficiently collected with high reliability by using the TPM.

Furthermore, according to the first embodiment, when the electronic signature is displayed on the sticker attached to the equipment, the service user equipment 40 generates an information output request of the information of the equipment based on the electronic signature input by the service user, and transmits the generated information output request to the environment control center terminal 20. Accordingly, the service user can confirm whether the equipment can receive the service from the service provider easily and efficiently, by inputting the electronic signature printed on the sticker attached to the equipment.

Moreover, according to the first embodiment, since the environment control center terminal 20 transmits the electronic certificate issued by the higher-level authentication center, which authenticates whether the electronic signature is issued by a legitimate environment control center, to the service user equipment 40, the user can reliably verifies that the electronic signature is issued by the legitimate environment control center.

Furthermore, according to the first embodiment, the environment control center terminal 20 generates the electronic signature based on the information of the environment of the equipment, identification information of the equipment different for each equipment can be efficiently generated by using the electronic signature.

Moreover, according to the first embodiment, further, the service user equipment 40 decodes the electronic signature by using the public key corresponding to the secret key used at the time of generating the electronic signature, and transmits an information output request including the hash value information obtained by decoding the electronic signature, and the environment control center terminal 20 searches for the information of the equipment corresponding to the electronic signature, by using the information of the hash value included in the information output request as a search key. As a result, when the electronic signature is forged, information of the equipment corresponding to the electronic signature cannot be found. Accordingly, the user can confirm whether the electronic signature is legitimate easily and efficiently.

According to the first embodiment, a case that the equipment vender transmits the environment information of the equipment to the environment control center has been explained. However, when the respective pieces of equipment are used in combination, the equipment may not operate normally depending on a combination of the vender products (software or hardware) built in the respective equipment. Therefore, a combination verifying organization that verifies compatibility of the combination of the vender products can verify the compatibility of the vender products, and transmit the result to the environment control center.

The environment control center can correct the evaluation value of the equipment based on the verification result, and can appropriately control whether the service is to be provided to the equipment. According to a second embodiment of the present invention, therefore, a case that the combination verifying organization verifies the compatibility of the vender products built in the equipment is explained.

Figure 20:
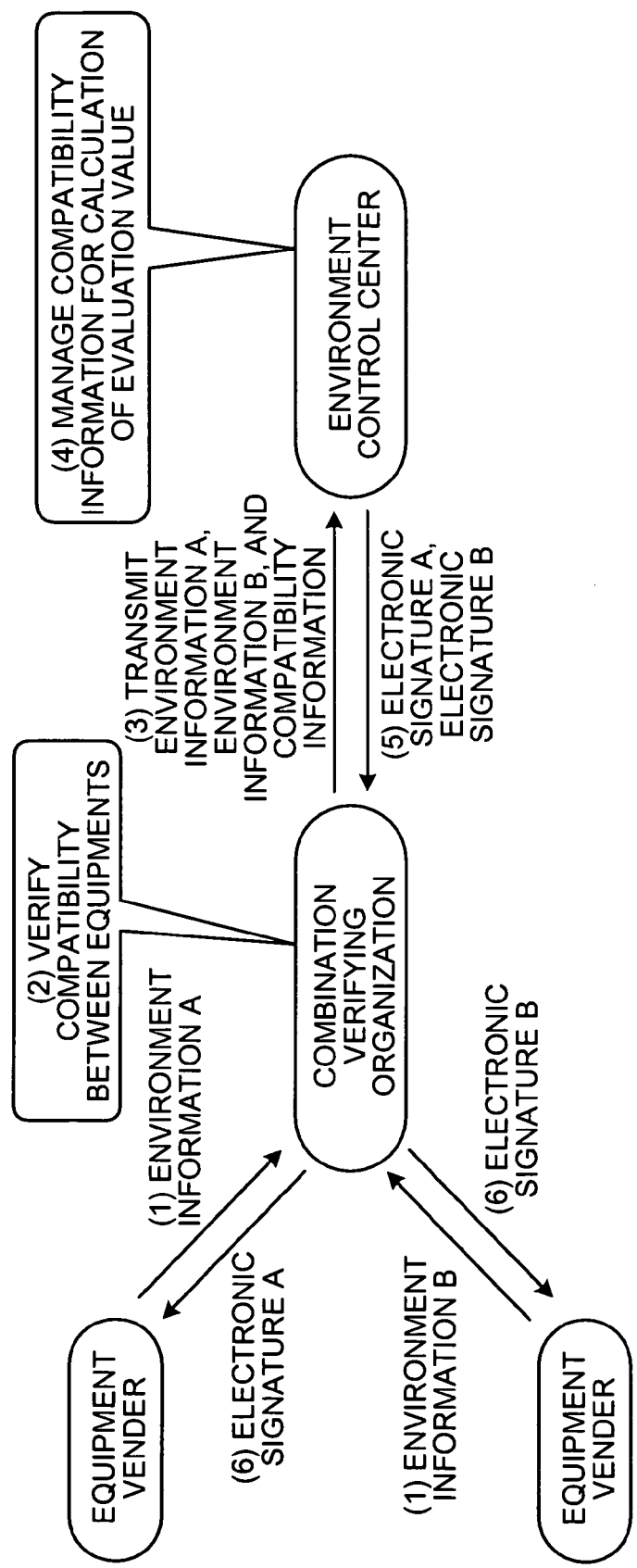
FIG. 20 is an explanatory diagram of a concept of a compatibility verification process according to a second embodiment of the present invention.

FIG. 20 is an explanatory diagram of the concept of the compatibility verification process according to the second embodiment. In the compatibility verification process between respective equipment, the combination verifying organization receives the environment information (environment information A and environment information B) of the equipment from a plurality of equipment venders (see FIG. 20(1)), and verifies the compatibility between the vender products (see FIG. 20(2)).

The combination verifying organization transmits the environment information of the respective equipment received from the equipment venders to the environment control center, and transmits compatibility information, which is the compatibility verification result, to the environment control center (see FIG. 20(3)).

The environment control center manages the compatibility information received from the combination verifying organization for calculating the evaluation value (see FIG. 20(4)). Specifically, the environment control center registers the compatibility information in the database, and at the time of calculating the evaluation value of the service user equipment as explained in the first embodiment, if vender products having poor compatibility with each other are built in the service user equipment, decreases the evaluation value.

On the other hand, the environment control center generates the electronic signatures (electronic signatures A and B) based on the environment information of the equipment received from the combination verifying organization, and transmits the generated electronic signatures to the combination verifying organization as explained in the first embodiment (see FIG. 20(5)).

The combination verifying organization transmits the electronic signatures received from the environment control center to the respective equipment venders (see FIG. 20(6)). The subsequent process is not shown in FIG. 20, however, the same process explained in the first embodiment is performed. That is, the respective equipment venders create the sticker on which the electronic signature received from the combination verifying organization is printed, and attaches the sticker to the equipment and markets the equipment.

When the user confirms whether the electronic signature printed on the sticker attached to the equipment is legitimate, the service user generates a hash value by decoding the encoded electronic signature, and transmits the hash value to the terminal in the environment control center.

The terminal in the environment control center having received the hash value searches for the information (for example, product name of the equipment and the like) of the equipment corresponding to the hash value, and when the information of the equipment is found, transmits the information of the equipment to the service user terminal. Accordingly, the service user can confirm that the electronic signature is legitimate, and can also confirm that the electronic signature is not the one issued for different equipment by confirming that the transmitted equipment information matches the equipment, which the user is going to use.

Since the service user can easily confirm whether the equipment can receive the service, the service user can have a sense of security. Therefore, the equipment vender can promote the sales of the equipment. Furthermore, if it is configured that the environment control center receives a fee of the electronic signature from the equipment vendor, the environment control center can also make a profit therefrom. Furthermore, if it is configured that the combination verifying organization also receives a fee for verifying the compatibility from the equipment vendor, the combination verifying organization can also make a profit therefrom.

Figure 21:
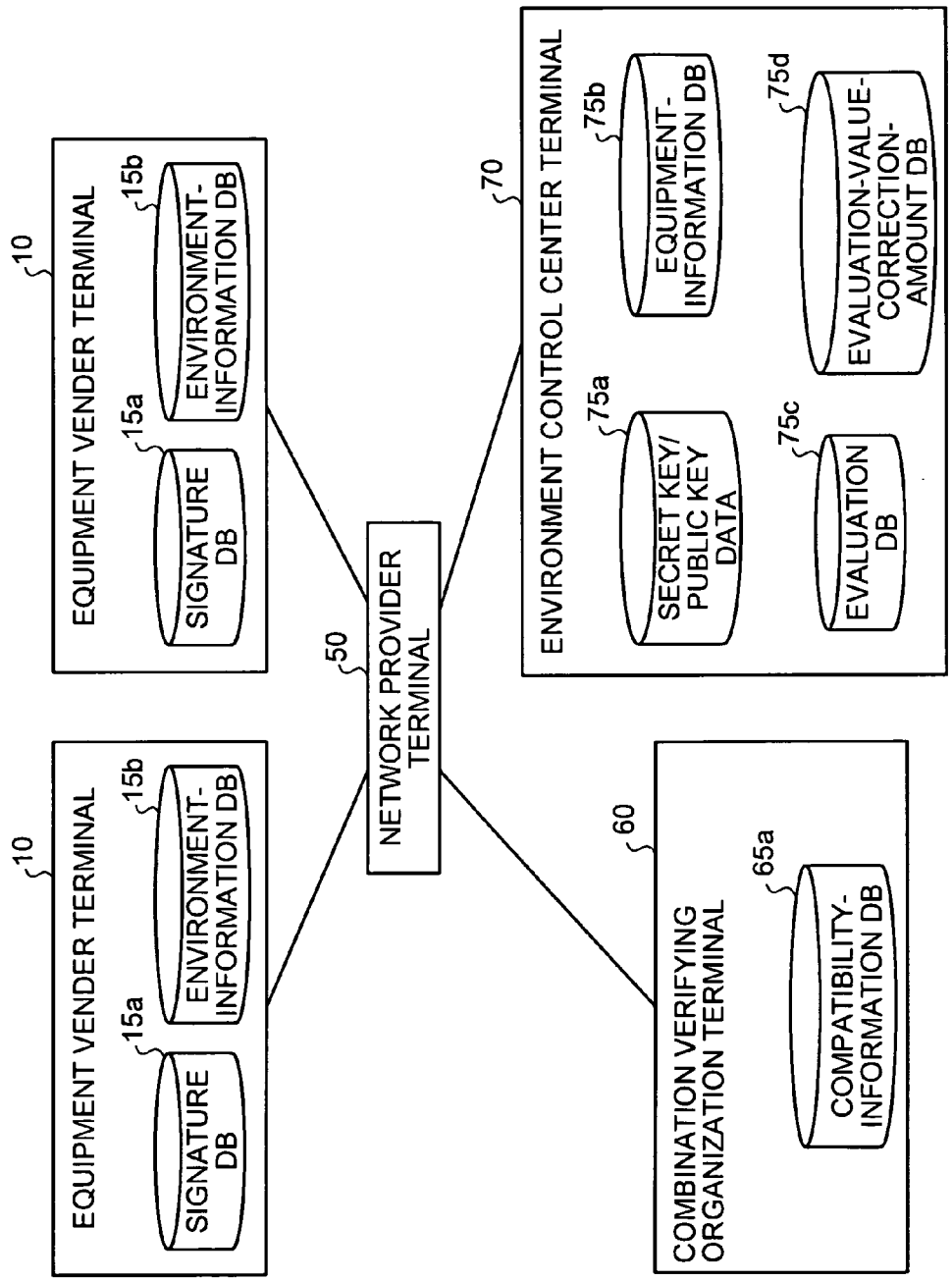
FIG. 21 depicts a configuration of the service control system according to the second embodiment.

FIG. 21 depicts the configuration of the service control system according to the second embodiment. Like reference signs refer to like parts according to the first embodiment.

The service control system according to the second embodiment is formed by connecting a plurality of equipment vender terminals 10, a combination verifying organization terminal 60, an environment control center terminal 70, the service provider terminal (not shown) and the service user equipment (not shown) by the network provider terminal 50 via the network, so as to be able to communicate with each other.

Since the service provider terminal, the service user equipment, and the network provider terminal 50 are the same as the service provider terminal 30 and the service user equipment 40 explained in FIG. 3, the explanation thereof is omitted.

The equipment vender terminal 10 is a computer that is the same as the equipment vender terminal 10 explained in FIG. 3, and includes the signature DB 15a shown in FIG. 4 and the environment-information DB 15b shown in FIG. 5.

The combination verifying organization terminal 60 is a computer that is held in the combination verifying organization, and, as shown in FIG. 21, includes a compatibility-information DB 65a. The compatibility-information DB 65a stores the information of the compatibility between the vender products, and specifically, as shown in FIG. 22, stores combination IDs for uniquely identifying combinations of the vender products and combination information of the vender products determined to have poor compatibility in association with each other.

The environment control center terminal 70 is a server computer that is held in the environment control center, and includes, as shown in FIG. 21, secret key/pubic key data 75a, an equipment-information DB 75b, an evaluation DB 75c, and an evaluation-value-correction-amount DB 75d. The environment control center terminal 70 is different from the environment control center terminal 20 shown in FIG. 3 in that it includes the evaluation-value-correction-amount DB 75d.

The secret key/pubic key data 75a, the equipment-information DB 75b, and the evaluation DB 75c are the same as the secret key/pubic key data 25a, the equipment-information DB 25b, and the evaluation DB 25c in the environment control center terminal 20 explained in FIG. 3.

The evaluation-value-correction-amount DB 75d stores information of the correction amount when the environment information received from the service user equipment includes vender products having poor compatibility with each other, and the evaluation value of the service user equipment is corrected to be low, and specifically, as shown in FIG. 23, stores the combination IDs for uniquely identifying combinations of vender products, combinations of vender products having poor compatibility with each other, and correction amounts of the evaluation values in association with each other.

The "combination ID" and the "combination of vender products" are registered in the evaluation-value-correction-amount DB 75d every time the compatibility information is received from the equipment vender, and the "correction amount of the evaluation value" is registered upon reception of a notification of the correction amount of the evaluation value from the service provider or the like.

Figure 24:
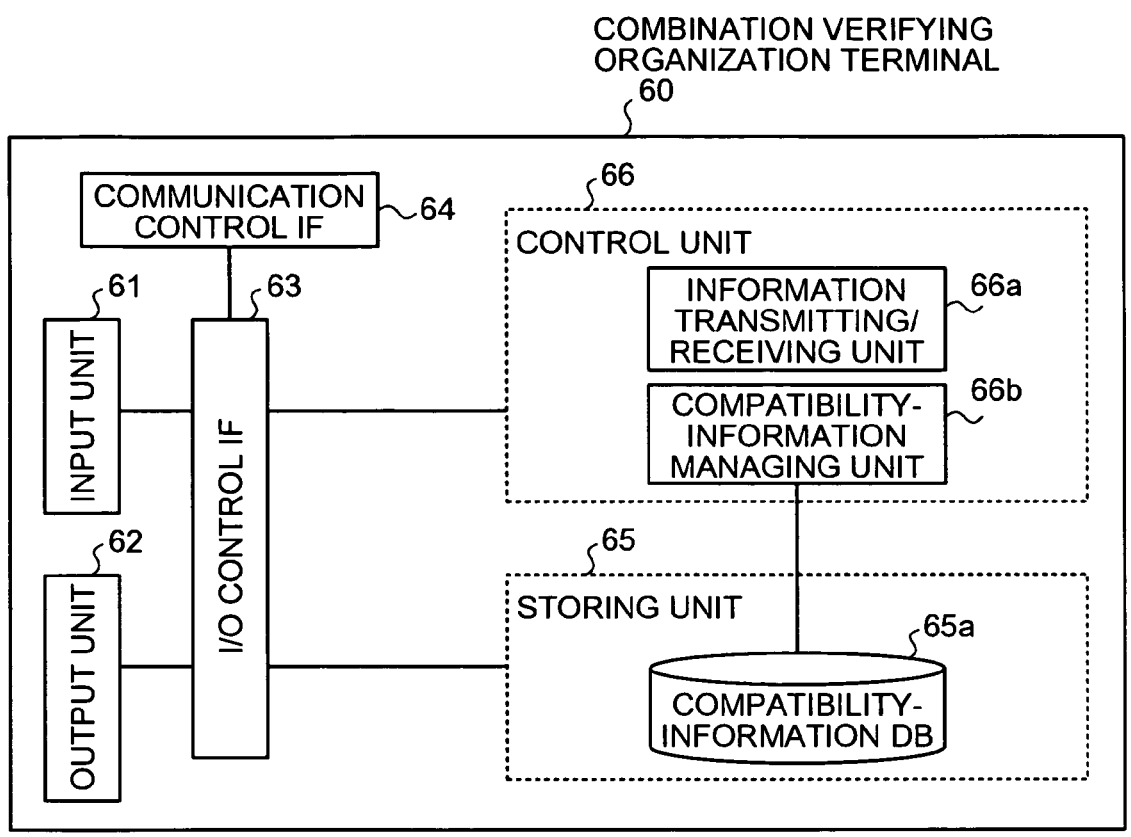
FIG. 24 depicts a functional configuration of a combination verifying organization terminal.

FIG. 24 depicts the functional configuration of the combination verifying organization terminal 60. As shown in FIG. 24, the combination verifying organization terminal 60 includes an input unit 61, an output unit 62, an I/O control IF 63, a communication control IF 64, a storing unit 65, and a control unit 66.

The input unit 61 is, for example, a keyboard, a mouse, a microphone, and the like that input various pieces of information. The output unit 62 is, for example, a monitor (or a display or a touch panel), a speaker, a printer, and the like that output various pieces of information.

The I/O control IF 63 controls input and output of data by the input unit 61 and the output unit 62, and the communication control IF 64 controls communication with the equipment vendor terminal 10 and the environment control center terminal 70.

The storing unit 65 stores data and programs required for various types of processes performed by the control unit 66, and includes the compatibility-information DB 65a (see FIG. 22).

The control unit 66 has an internal memory for storing programs specifying various process procedures and control data, executes various types of processes according to these programs and data, and includes an information transmitting/receiving unit 66a and a compatibility-information managing unit 66b.

An information transmitting/receiving unit 66a receives the environment information from the equipment vender terminal 10, transmits the received environment information together with the compatibility information of the equipment to the environment control center terminal 70, receives an electronic signature from the environment control center terminal 70, and transmits the received electronic signature to the respective equipment vender terminals 10.

The compatibility-information managing unit 66b manages the compatibility information between the equipment. Specifically, the compatibility-information managing unit 66b obtains the compatibility information, which is the result of verifying the compatibility between the equipment, whose environment information is received from the equipment vender terminal 10, and stores the compatibility information in the compatibility-information DB 65a. The compatibility information can be obtained by receiving an input of the environment information by the input unit 61, or can be obtained via the network from other apparatuses via the communication control IF 64.

Figure 25:
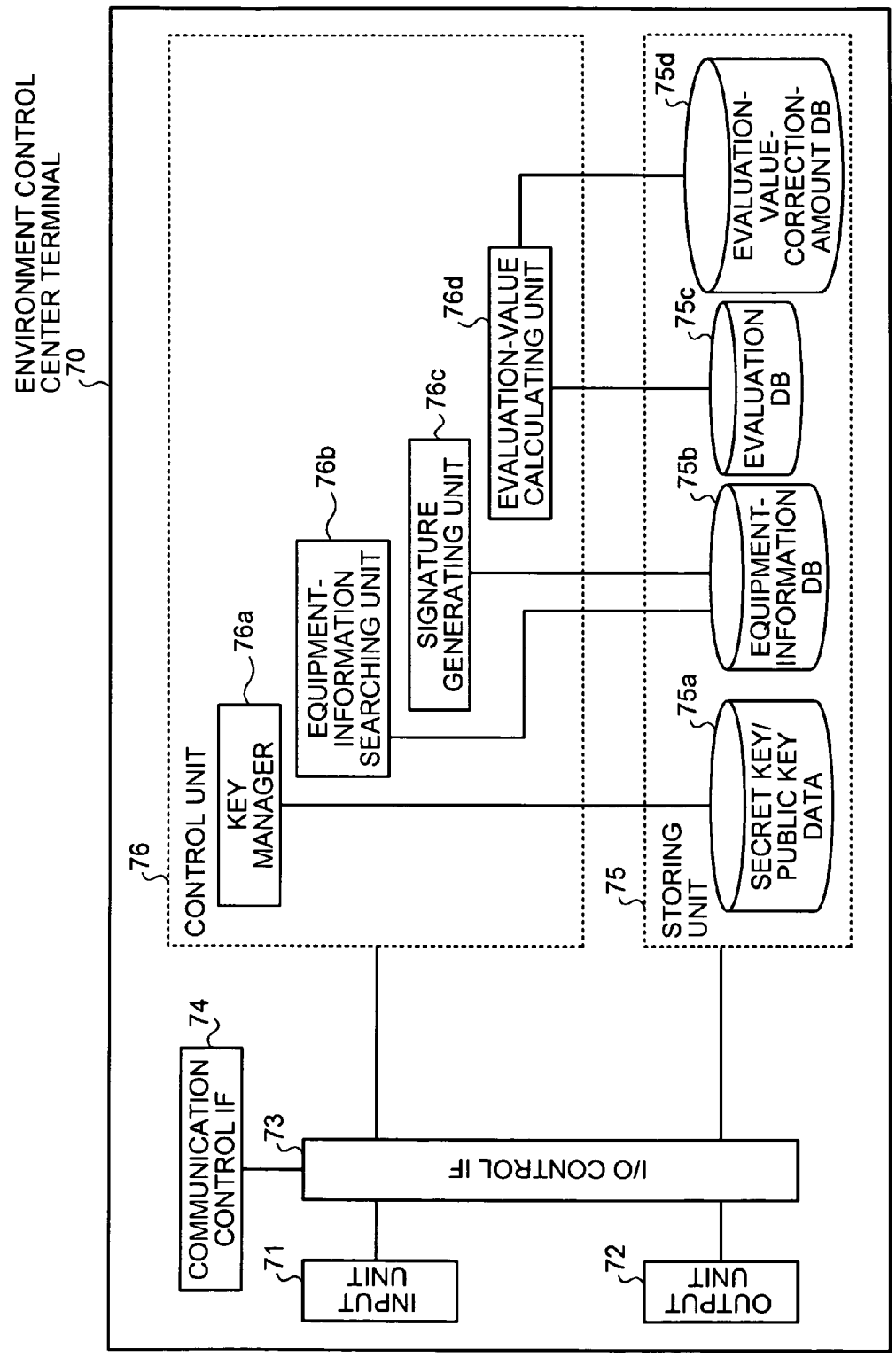
FIG. 25 depicts a functional configuration of an environment control center terminal.

FIG. 25 depicts the functional configuration of the environment control center terminal 70. As shown in FIG. 25, the environment control center terminal 70 includes an input unit 71, an output unit 72, an I/O control IF 73, a communication control IF 74, a storing unit 75, and a control unit 76.

The input unit 71 is, for example, a keyboard, a mouse, a microphone, and the like that input various pieces of information. The output unit 72 is, for example, a monitor (or a display or a touch panel), a speaker, a printer, and the like that output various pieces of information.

The I/O control IF 73 controls input and output of data by the input unit 71 and the output unit 72, and the communication control IF 74 controls communication with the combination verifying organization terminal 60, the service provider terminal, and the service user equipment.

The storing unit 75 stores data and programs required for various types of processes performed by the control unit 76, and includes the secret key/public key data 75a, the equipment-information DB 75b, the evaluation DB 75c, and the evaluation-value-correction-amount DB 75d.

The secret key/pubic key data 75a, the equipment-information DB 75b, and the evaluation DB 75c are the same as the secret key/pubic key data 25a, the equipment-information DB 25b, and the evaluation DB 25c in the environment control center terminal 20 explained in FIG. 3.

The evaluation-value-correction-amount DB 75d stores information of the correction amount when the vender products having poor compatibility with each other are built in the service user equipment, and the evaluation value of the service user equipment is corrected to be low (see FIG. 23).

The control unit 76 has an internal memory for storing programs specifying various process procedures and control data, executes various types of processes according to these programs and data, and includes a key managing unit 76a, an equipment-information searching unit 76b, a signature generating unit 76c, and an evaluation-value calculating unit 76d.

The key managing unit 76a, the equipment-information searching unit 76b, and the signature generating unit 76c are the same as the key managing unit 26a, the equipment-information searching unit 26b, and the signature generating unit 26c in the environment control center terminal 20 shown in FIG. 15.

The evaluation-value calculating unit 76d evaluates the environment relating to the service user equipment to calculate an evaluation value. Specifically, as explained in the first embodiment, upon reception of an evaluation request including the hashed environment-information and the service-request ID from the service provider terminal, the evaluation-value calculating unit 76d reads the evaluation value corresponding to the hashed environment-information included in the request from the evaluation DB 75c.

Furthermore, the evaluation-value calculating unit 76d checks whether the combination of vendor products built in the service user equipment corresponds to the combination of vendor products having poor compatibility stored in the evaluation-value-correction-amount DB 75d.

When the combination of vendor products corresponds to the combination of vendor products having poor compatibility, the evaluation-value calculating unit 76d corrects the evaluation value read from the evaluation DB 75c by using the correction amount stored in the evaluation-value-correction-amount DB 75d, to calculate the evaluation value. Thereafter, the evaluation value calculated by the evaluation-value calculating unit 76d is transmitted to the service provider terminal, so that the service provided to the service user equipment is controlled as explained in the first embodiment.

As explained above, according to the second embodiment, the combination verifying organization terminal 60 receives information of the environment of pieces of equipment from the equipment vendor terminal 10, and transmits compatibility information of the combination of environments created based on the received information of the environment of the equipment together with the information of the environment of respective equipment. The service provider terminal controls the service to be provided to the equipment based on the compatibility information of the combination of environments transmitted by the combination verifying organization terminal 60. The environment control center terminal 70 then generates an electronic signature for each equipment based on the information of the environment of the equipment. Accordingly, when there is a combination of equipment having poor compatibility, the service to be provided to the equipment can be controlled, taking the combination into consideration.

Various types of processes explained in the above embodiments can be realized by executing the prepared program by a computer. One example of the computer that executes the program for realizing various types of processes is explained below, with reference to FIG. 26.

FIG. 26 depicts the hardware configuration of the computer, which constitutes various devices such as the equipment vendor terminal 10, the environment control center terminal 20, the service provider terminal 30, the service user equipment 40, the combination verifying organization terminal 60, or the environment control center terminal 70.

The computer is constituted by connecting an input unit 100 that receives an input of data from a user, a monitor 101, a random access memory (RAM) 102, a read only memory (ROM) 103, a medium reading unit 104 that reads a program from a recording medium, on which various programs are recorded, a network IF 105 for performing data transfer with other computers via the network, a CPU 106, and a hard disk drive (HDD) 107 via a bus 108.

Various programs 107b that exhibits similar functions to those of the respective devices are stored in the HDD 107. The CPU 106 reads the programs 107b from the HDD 107 and executes the programs, thereby activating various processes 106a for realizing the functions of the functional units in the respective devices.

Various data 107a corresponding to data to be stored in the storing unit in the respective devices are also stored in the HDD 107. The CPU 106 stores the data 107a in the HDD 107, and reads the data 107a from the HDD 107 to store the data in the RAM 102, and executes data processing based on various data 102a stored in the RAM 102.

The programs 107b are not necessarily stored initially in the HDD. For example, the programs 107b can be stored in a "portable physical medium" such as an flexible disk (FD), CD-ROM, DVD disk, magneto-optical disk, or IC card to be inserted into the computer, a "fixed physical medium" such as a HDD equipped inside or outside of the computer, or "another computer (or server)" connected to the computer via a public line, the Internet, local area network (LAN), or wide area network (WAN), and the computer can read the programs 107b from these media and execute the program.

While the embodiments of the present invention have been explained above, variously modified embodiments other than the explained ones can be made without departing from the scope of the technical spirit of the appended claims.

Of the respective process explained in the embodiments, all or a part of the process explained as being performed automatically can be performed manually, or all or a part of the process explained as being performed manually can be performed automatically by a known method.

The information including the process procedure, the control procedure, specific names, and various kinds of data and parameters shown in the specification or in the drawings can be optionally changed, unless otherwise specified.

The respective constituent elements of the respective devices shown in the drawings are functionally conceptual, and physically the same configuration is not always necessary. In other words, the specific mode of dispersion and integration of the devices is not limited to the shown one, and all or a part thereof can be functionally or physically dispersed or integrated in an optional unit, according to the various kinds of load and the status of use.

All or an optional part of the various process functions performed by the respective devices can be realized by the CPU or a program analyzed and executed by the CPU, or can be realized as hardware by the wired logic.

According to an embodiment of the present invention, the user can confirm whether the equipment can receive the service from the service provider easily and efficiently.

Furthermore, according to an embodiment the present invention, the information of the environment of the equipment can be efficiently collected with high reliability by using the TPM.

Moreover, according to an embodiment the present invention, the user can confirm whether the equipment can receive the service from the service provider easily and efficiently, by inputting identification information displayed on the equipment, for example, by printing the identification information on a sticker and attaching it to the equipment.

Furthermore, according to an embodiment the present invention, the user can reliably verify that the identification information is issued by a legitimate organization.

Moreover, according to an embodiment the present invention, identification information different for each equipment can be efficiently generated.

Furthermore, according to an embodiment the present invention, when the electronic signature is forged, information of the equipment corresponding to the electronic signature cannot be found. Therefore, the user can confirm whether the electronic signature is legitimate easily and efficiently.

Moreover, according to an embodiment the present invention, when there is a combination of equipment having poor compatibility, this can be taken into consideration when the service to be provided to the equipment is controlled.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A non-transitory computer-readable recording medium encoded with a computer program, executed by a processor, the computer program causing a computer to execute:
generating identification information for an equipment based on environment information including information of software and hardware built in the equipment and information of hardware connected to the equipment;
searching, when an information output request for evaluation value including the identification information is received from an other computer that is accessible from a computer including the equipment, a database for the evaluation value of the equipment corresponding to the identification information, the evaluation value being given from viewpoints of safety and performance based on the vulnerability and capacity of the software and the hardware; and
transmitting the evaluation value, searched by the searching, to the other computer.

2. The non-transitory computer-readable recording medium according to claim 1, wherein the environment information is read by a trusted platform module.

3. The non-transitory computer-readable recording medium according to claim 1, wherein:
the identification information generated by the information generating unit is displayed on the equipment, and the identification information is input by a user of the equipment.

4. The non-transitory computer-readable recording medium according to claim 1, wherein the computer program further causes the computer to execute transmitting an electronic certificate certifying that the identification information is issued by an authorized organization.

5. The non-transitory computer-readable recording medium according to claim 1, wherein the generating includes generating an electronic signature based on the environment information as the identification information.

6. The non-transitory computer-readable recording medium according to claim 5, wherein:
   the information output request includes information obtained by decoding the electronic signature by using a decryption key corresponding to an encryption key used for generating the electronic signature, and
   the searching includes searching the database for the equipment information corresponding to the electronic signature, using the information obtained by decoding the electronic signature as a search key.

7. An equipment-information transmitting apparatus comprising:
   an information generating unit that generates identification information for an equipment based on environment information including information of software and hardware built in the equipment and information of hardware connected to the equipment;
   a search unit that searches, when an information output request for evaluation value including the identification information is received from an other computer that is accessible from a computer including the equipment, a database for the evaluation value of the equipment corresponding to the identification information, the evaluation value being given from viewpoints of safety and performance based on the vulnerability and capacity of the software and the hardware; and
   a transmitting unit that transmits the evaluation value, searched by the search unit, to the other computer.

8. A method of transmitting information comprising:
   generating identification information, using a processor, for an equipment based on environment information including information of software and hardware built in the equipment and information of hardware connected to the equipment;
   searching, when an information output request for evaluation value including the identification information is received from an other computer that is accessible from a computer including the equipment, a database for the evaluation value of the equipment information corresponding to the identification information, the evaluation value being given from viewpoints of safety and performance based on the vulnerability and capacity of the software and the hardware; and
   transmitting the evaluation value, searched by the searching, to the other computer.

* * * * *